US012689428B2

(12) United States Patent
Raghavan et al.

(10) Patent No.: US 12,689,428 B2
(45) Date of Patent: Jul. 21, 2026

(54) TECHNIQUES FOR DETECTING BLOCKAGE CONDITIONS

(71) Applicant: QUALCOMM Incorporated, San Diego, CA (US)

(72) Inventors: Vasanthan Raghavan, West Windsor Township, NJ (US); Qiaoyu Li, Beijing (CN); Tao Luo, San Diego, CA (US); Mahmoud Taherzadeh Boroujeni, San Diego, CA (US); Junyi Li, Greentown, PA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 18/706,299

(22) PCT Filed: Dec. 7, 2021

(86) PCT No.: PCT/CN2021/136006
§ 371 (c)(1),
(2) Date: Apr. 30, 2024

(87) PCT Pub. No.: WO2023/102719
PCT Pub. Date: Jun. 15, 2023

(65) Prior Publication Data
US 2024/0421888 A1 Dec. 19, 2024

(51) Int. Cl.
*H04L 5/00* (2006.01)
*H04B 7/06* (2006.01)

(52) U.S. Cl.
CPC ....... *H04B 7/06966* (2023.05); *H04L 5/0048* (2013.01); *H04L 5/006* (2013.01)

(58) Field of Classification Search
CPC H04B 7/063; H04B 7/06952; H04B 7/06966; H04B 17/318; H04L 5/0048; H04L 5/006
(Continued)

(56) References Cited

U.S. PATENT DOCUMENTS

| | | | |
|---|---|---|---|
| 11,563,611 B1 * | 1/2023 | Marupaduga | ....... H04W 52/242 |
| 2012/0004005 A1 | 1/2012 | Ahmed et al. | |

(Continued)

FOREIGN PATENT DOCUMENTS

| | | |
|---|---|---|
| CN | 107948987 A | 4/2018 |
| WO | WO-2017099830 A1 | 6/2017 |

(Continued)

OTHER PUBLICATIONS

International Search Report and Written Opinion—PCT/CN2021/136006—ISA/EPO—Aug. 26, 2022.
(Continued)

*Primary Examiner* — Robert J Lopata
(74) *Attorney, Agent, or Firm* — Holland & Hart LLP

(57) ABSTRACT

Methods, systems, and devices for wireless communication are described. A user equipment (UE) may detect and report blockage conditions based on measuring signal strengths of reference signals. A UE may determine a slew rate for the signal strength, corresponding to a rate of change of a signal strength parameter (e.g., a reference signal received power (RSRP) or a received signal strength indicator (RSSI)) with respect to time, and report the slew rate to a base station to indicate signal strength degradation (e.g., due to a blockage). In some examples, the UE may define multiple slew rates associated with different rates of change of the signal strength parameter with respect to time. When the UE crosses a level of slew rate, the UE may indicate this to the base station to initiate mitigation procedures. In some examples, the techniques described herein may be extended to reporting slew rates for multiple beams.

30 Claims, 16 Drawing Sheets

(58) Field of Classification Search
    USPC ......................................................... 370/329
    See application file for complete search history.

(56)                          References Cited

U.S. PATENT DOCUMENTS

| | | | |
|---|---|---|---|
| 2012/0093016 A1 | 4/2012 | Zhang et al. | |
| 2016/0150418 A1 | 5/2016 | Kang et al. | |
| 2017/0212244 A1 | 7/2017 | Park | |
| 2021/0377813 A1* | 12/2021 | Landis | H04W 72/542 |
| 2022/0060974 A1* | 2/2022 | Zeng | H04W 48/20 |
| 2024/0276278 A1* | 8/2024 | Tang | H04W 64/00 |

FOREIGN PATENT DOCUMENTS

| | | |
|---|---|---|
| WO | WO-2020231853 A1 | 11/2020 |
| WO | WO-2020259832 A1 | 12/2020 |

OTHER PUBLICATIONS

Supplementary European Search Report—EP21966647—Search Authority—Munich—Jul. 21, 2025.
ETSI: "5G, NR, Physical Layer Procedures for Data (3GPP TS 38.214 Version 15.3.0 Release 15)", ETSI TS 138 214 V15.3.0, Technical Specification, Oct. 2018, 99 Pages.

* cited by examiner 910    920    915

905

900

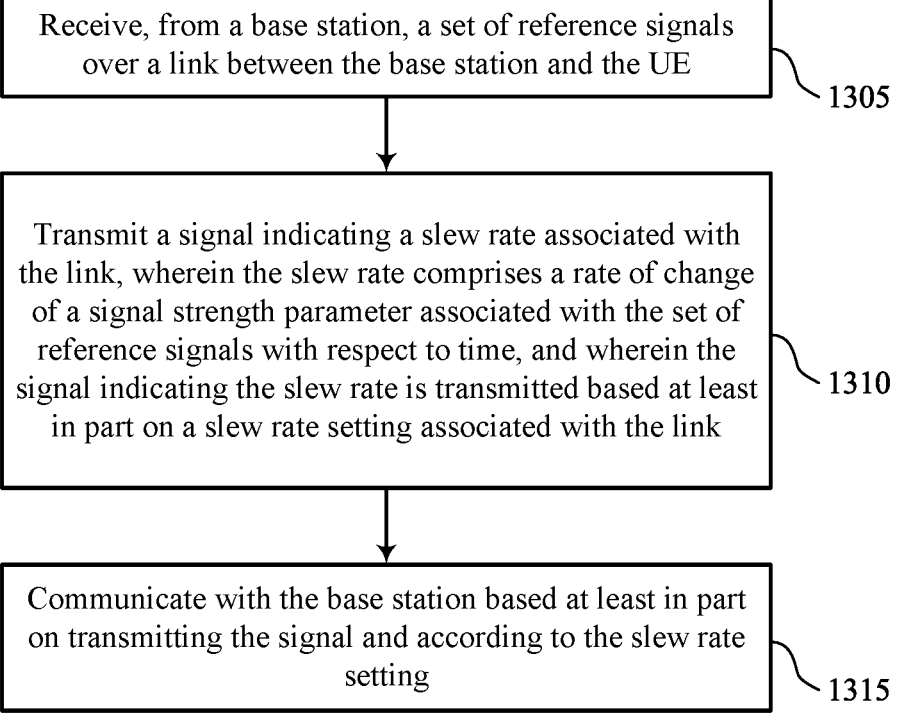

Receive, from a base station, a set of reference signals over a link between the base station and the UE

1305

Transmit a signal indicating a slew rate associated with the link, wherein the slew rate comprises a rate of change of a signal strength parameter associated with the set of reference signals with respect to time, and wherein the signal indicating the slew rate is transmitted based at least in part on a slew rate setting associated with the link

1310

Communicate with the base station based at least in part on transmitting the signal and according to the slew rate setting

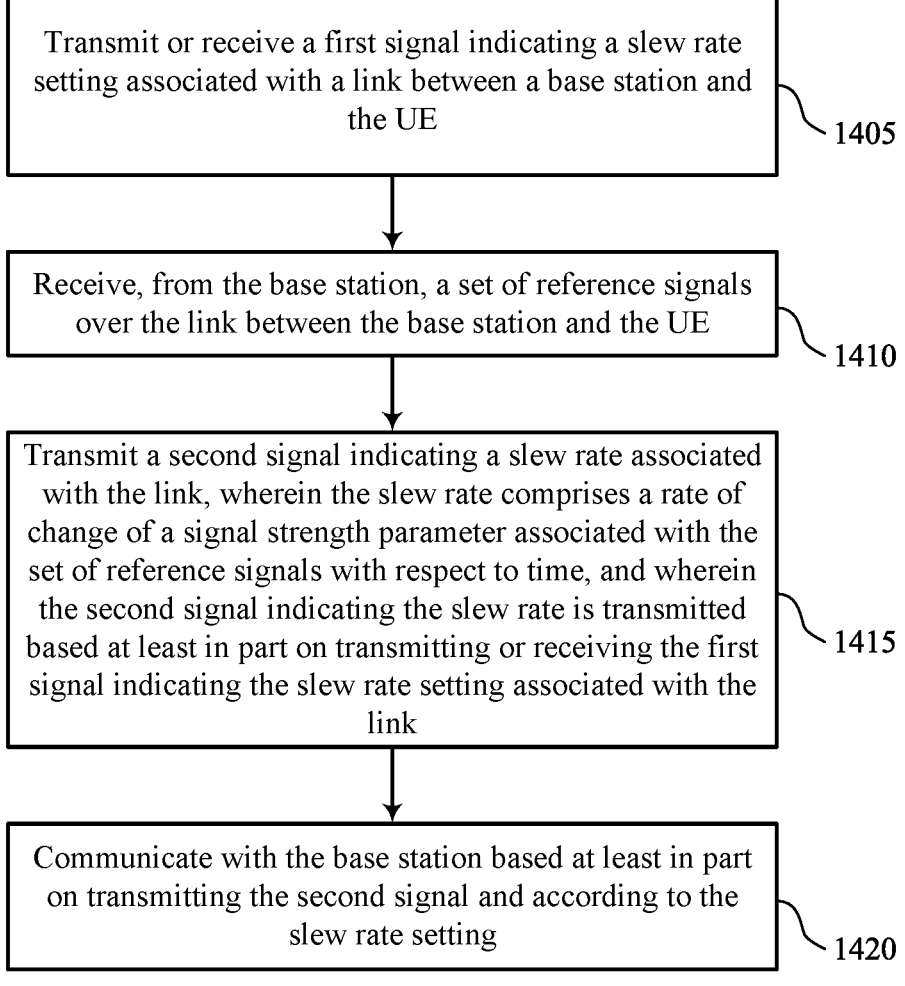

Transmit or receive a first signal indicating a slew rate setting associated with a link between a base station and the UE

1405

Receive, from the base station, a set of reference signals over the link between the base station and the UE

1410

Transmit a second signal indicating a slew rate associated with the link, wherein the slew rate comprises a rate of change of a signal strength parameter associated with the set of reference signals with respect to time, and wherein the second signal indicating the slew rate is transmitted based at least in part on transmitting or receiving the first signal indicating the slew rate setting associated with the link

1415

Communicate with the base station based at least in part on transmitting the second signal and according to the slew rate setting

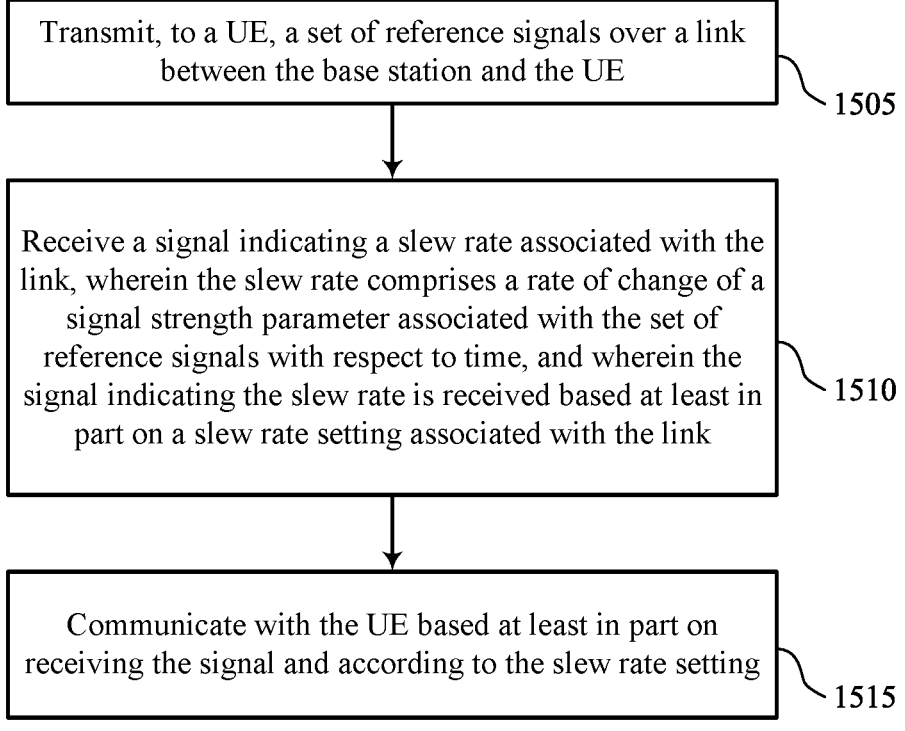

Transmit, to a UE, a set of reference signals over a link between the base station and the UE

1505

Receive a signal indicating a slew rate associated with the link, wherein the slew rate comprises a rate of change of a signal strength parameter associated with the set of reference signals with respect to time, and wherein the signal indicating the slew rate is received based at least in part on a slew rate setting associated with the link

1510

Communicate with the UE based at least in part on receiving the signal and according to the slew rate setting

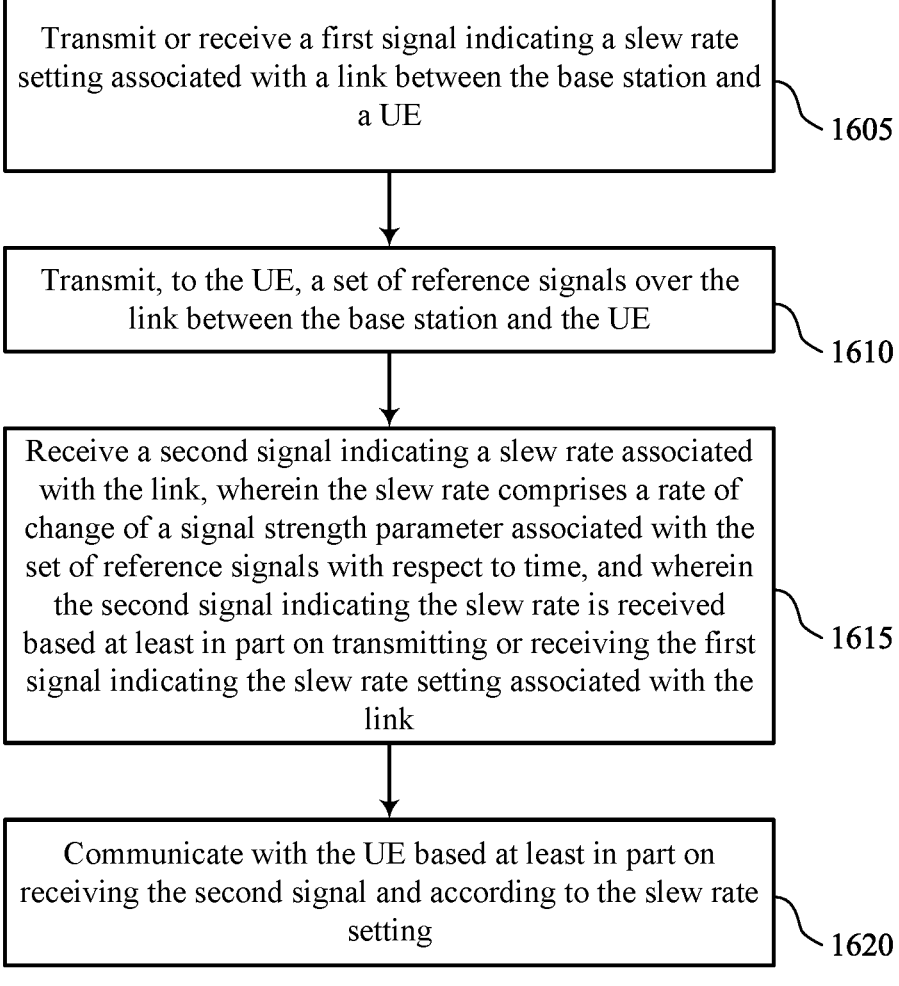

Transmit or receive a first signal indicating a slew rate setting associated with a link between the base station and a UE

1605

Transmit, to the UE, a set of reference signals over the link between the base station and the UE

1610

Receive a second signal indicating a slew rate associated with the link, wherein the slew rate comprises a rate of change of a signal strength parameter associated with the set of reference signals with respect to time, and wherein the second signal indicating the slew rate is received based at least in part on transmitting or receiving the first signal indicating the slew rate setting associated with the link

1615

Communicate with the UE based at least in part on receiving the second signal and according to the slew rate setting

TECHNIQUES FOR DETECTING BLOCKAGE CONDITIONS

CROSS REFERENCE

The present application is a 371 national stage filing of International PCT Application No. PCT/CN2021/136006 by RAGHAVAN et al. entitled "TECHNIQUES FOR DETECTING BLOCKAGE CONDITIONS," filed Dec. 7, 2021, which is assigned to the assignee hereof, and which is expressly incorporated by reference in its entirety herein.

FIELD OF TECHNOLOGY

The following relates to wireless communication, including techniques for detecting blockage conditions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may be configured to communicate with a base station using beamformed transmissions. However, for some use cases, existing beamforming techniques may be deficient or sub-optimal in some current configurations.

SUMMARY

The described techniques relate to improved methods, systems, devices, and apparatuses that support techniques for detecting blockage conditions. Generally, the described techniques provide for enabling a user equipment (UE) to detect and report blockage conditions based on measuring signal strengths of reference signals. A UE may determine a slew rate for the signal strength, corresponding to a rate of change (e.g., with respect to time) of a signal strength parameter (e.g., a reference signal received power (RSRP) or a received signal strength indicator (RSSI) a reference signal received quality (RSRQ), a signal-to-noise ratio (SNR), a signal-to-interference-and-noise ratio (SINR), or another signal strength parameter), and report the slew rate to a base station to indicate signal strength degradation (e.g., due to the arrival or presence of a blockage condition) or signal strength improvement (e.g., due to the departure or removal of the blockage condition). In some examples, the UE may define multiple slew rates associated with different rates of change of the signal strength parameter with time. When the UE crosses a level of slew rate (e.g., a slew rate threshold), the UE may indicate this to the base station to initiate appropriate resources for mitigating the impact of the blockage condition. For example, when the UE crosses a first (e.g., lowest) slew rate threshold, the base station may assign resources for the UE to monitor for reference signals to identify alternate beam pairs to address the blockage condition. If the UE crosses a second slew rate threshold, the base station may switch to operating using a different beam and use the resources indicated upon crossing the first slew rate to allow the UE to determine an alternative beam. If the UE crosses a third slew rate threshold, the UE may switch to a different beam for communicating with the base station, either a previously determined beam or a beam identified based on the monitoring the reference signals. In some examples, the techniques described herein may be extended to reporting slew rates for multiple beams and multiple slew rates.

A method for wireless communication at a UE is described. The method may include receiving, from a base station, a set of reference signals over a link between the base station and the UE, transmitting a signal indicating a slew rate associated with the link, where the slew rate includes a rate of change of a signal strength parameter associated with the set of reference signals with respect to time, and where the signal indicating the slew rate is transmitted based on a slew rate setting associated with the link, and communicating with the base station based on transmitting the signal and according to the slew rate setting.

An apparatus for wireless communication at a UE is described. The apparatus may include a processor, memory coupled with the processor, and instructions stored in the memory. The instructions may be executable by the processor to cause the apparatus to receive, from a base station, a set of reference signals over a link between the base station and the UE, transmit a signal indicating a slew rate associated with the link, where the slew rate includes a rate of change of a signal strength parameter associated with the set of reference signals with respect to time, and where the signal indicating the slew rate is transmitted based on a slew rate setting associated with the link, and communicate with the base station based on transmitting the signal and according to the slew rate setting.

Another apparatus for wireless communication at a UE is described. The apparatus may include means for receiving, from a base station, a set of reference signals over a link between the base station and the UE, means for transmitting a signal indicating a slew rate associated with the link, where the slew rate includes a rate of change of a signal strength parameter associated with the set of reference signals with respect to time, and where the signal indicating the slew rate is transmitted based on a slew rate setting associated with the link, and means for communicating with the base station based on transmitting the signal and according to the slew rate setting.

A non-transitory computer-readable medium storing code for wireless communication at a UE is described. The code may include instructions executable by a processor to receive, from a base station, a set of reference signals over a link between the base station and the UE, transmit a signal indicating a slew rate associated with the link, where the slew rate includes a rate of change of a signal strength parameter associated with the set of reference signals with respect to time, and where the signal indicating the slew rate is transmitted based on a slew rate setting associated with the link, and communicate with the base station based on transmitting the signal and according to the slew rate setting.

Some examples of the method, apparatuses, and non-transitory computer-readable medium described herein may further include operations, features, means, or instructions for receiving, from the base station, a second signal indicating the slew rate setting, where the signal indicating the slew rate may be transmitted based on receiving the second signal.

Some examples of the method, apparatuses, and non-transitory computer-readable medium described herein may further include operations, features, means, or instructions for transmitting, to the base station, a second signal indicating the slew rate setting, where the signal indicating the slew rate may be transmitted based on transmitting the second signal.

Some examples of the method, apparatuses, and non-transitory computer-readable medium described herein may further include operations, features, means, or instructions for transmitting, to the base station, a second signal indicating a UE capability, where the slew rate setting may be based on the UE capability.

In some examples of the method, apparatuses, and non-transitory computer-readable medium described herein, communicating with the base station may include operations, features, means, or instructions for receiving a second signal indicating one or more reference signal resources and monitoring the one or more reference signal resources according to the slew rate setting and a beam refinement procedure or a beam failure recovery procedure.

In some examples of the method, apparatuses, and non-transitory computer-readable medium described herein, communicating with the base station may include operations, features, means, or instructions for receiving a third signal indicating a beam switch at the base station, where monitoring the one or more reference signal resources may be further based on receiving the third signal.

In some examples of the method, apparatuses, and non-transitory computer-readable medium described herein, communicating with the base station may include operations, features, means, or instructions for switching from a first beam to a second beam for communications with the base station based on monitoring the one or more reference signal resources.

In some examples of the method, apparatuses, and non-transitory computer-readable medium described herein, communicating with the base station may include operations, features, means, or instructions for switching from a first beam to a second beam for communications with the base station according to the slew rate setting.

In some examples of the method, apparatuses, and non-transitory computer-readable medium described herein, the slew rate setting includes one or more slew rate thresholds and the signal indicating the slew rate may be transmitted based on the slew rate satisfying a slew rate threshold of the one or more slew rate thresholds.

In some examples of the method, apparatuses, and non-transitory computer-readable medium described herein, the slew rate includes a first slew rate corresponding to a first beam associated with the link and the signal further indicates a second slew rate corresponding to a second beam associated with the link.

In some examples of the method, apparatuses, and non-transitory computer-readable medium described herein, the signal indicates the slew rate in one or more bits of a Layer 1 report.

In some examples of the method, apparatuses, and non-transitory computer-readable medium described herein, the signal strength parameter may be based on at least a received signal strength indicator, or a reference signal received power, or both.

A method for wireless communication at a base station is described. The method may include transmitting, to a UE, a set of reference signals over a link between the base station and the UE, receiving a signal indicating a slew rate associated with the link, where the slew rate includes a rate of change of a signal strength parameter associated with the set of reference signals with respect to time, and where the signal indicating the slew rate is received based on a slew rate setting associated with the link, and communicating with the UE based on receiving the signal and according to the slew rate setting.

An apparatus for wireless communication at a base station is described. The apparatus may include a processor, memory coupled with the processor, and instructions stored in the memory. The instructions may be executable by the processor to cause the apparatus to transmit, to a UE, a set of reference signals over a link between the base station and the UE, receive a signal indicating a slew rate associated with the link, where the slew rate includes a rate of change of a signal strength parameter associated with the set of reference signals with respect to time, and where the signal indicating the slew rate is received based on a slew rate setting associated with the link, and communicate with the UE based on receiving the signal and according to the slew rate setting.

Another apparatus for wireless communication at a base station is described. The apparatus may include means for transmitting, to a UE, a set of reference signals over a link between the base station and the UE, means for receiving a signal indicating a slew rate associated with the link, where the slew rate includes a rate of change of a signal strength parameter associated with the set of reference signals with respect to time, and where the signal indicating the slew rate is received based on a slew rate setting associated with the link, and means for communicating with the UE based on receiving the signal and according to the slew rate setting.

A non-transitory computer-readable medium storing code for wireless communication at a base station is described. The code may include instructions executable by a processor to transmit, to a UE, a set of reference signals over a link between the base station and the UE, receive a signal indicating a slew rate associated with the link, where the slew rate includes a rate of change of a signal strength parameter associated with the set of reference signals with respect to time, and where the signal indicating the slew rate is received based on a slew rate setting associated with the link, and communicate with the UE based on receiving the signal and according to the slew rate setting.

Some examples of the method, apparatuses, and non-transitory computer-readable medium described herein may further include operations, features, means, or instructions for transmitting, to the UE, a second signal indicating the slew rate setting, where the signal indicating the slew rate may be received based on transmitting the second signal.

Some examples of the method, apparatuses, and non-transitory computer-readable medium described herein may further include operations, features, means, or instructions for receiving, from the UE, a second signal indicating the slew rate setting, where the signal indicating the slew rate may be received based on receiving the second signal.

Some examples of the method, apparatuses, and non-transitory computer-readable medium described herein may further include operations, features, means, or instructions for receiving, from the UE, a second signal indicating a UE capability, where the slew rate setting may be based on the UE capability.

In some examples of the method, apparatuses, and non-transitory computer-readable medium described herein, communicating with the UE may include operations, features, means, or instructions for transmitting a second signal indicating one or more reference signal resources and transmitting one or more reference signals in the one or more reference signal resources according to the slew rate setting and a beam refinement procedure or a beam failure recovery procedure.

In some examples of the method, apparatuses, and non-transitory computer-readable medium described herein, communicating with the UE may include operations, features, means, or instructions for switching from a first beam to a second beam for communications with the UE, where transmitting the one or more reference signals may be further based on switching from the first beam to the second beam.

In some examples of the method, apparatuses, and non-transitory computer-readable medium described herein, communicating with the UE may include operations, features, means, or instructions for receiving a third signal indicating a beam switch at the UE based on transmitting the one or more reference signals.

In some examples of the method, apparatuses, and non-transitory computer-readable medium described herein, communicating with the UE may include operations, features, means, or instructions for receiving a third signal indicating a beam switch at the UE according to the slew rate setting.

In some examples of the method, apparatuses, and non-transitory computer-readable medium described herein, the slew rate setting includes one or more slew rate thresholds and the signal indicating the slew rate may be received based on the slew rate satisfying a slew rate threshold of the one or more slew rate thresholds.

In some examples of the method, apparatuses, and non-transitory computer-readable medium described herein, the slew rate includes a first slew rate corresponding to a first beam associated with the link and the signal further indicates a second slew rate corresponding to a second beam associated with the link.

In some examples of the method, apparatuses, and non-transitory computer-readable medium described herein, the signal indicates the slew rate in one or more bits of a Layer 1 report.

In some examples of the method, apparatuses, and non-transitory computer-readable medium described herein, the signal strength parameter may be based on at least a received signal strength indicator, or a reference signal received power, or both.

BRIEF DESCRIPTION OF THE DRAWINGS

FIGS. 13 through 16 show flowcharts illustrating methods that support techniques for detecting blockage conditions in accordance with aspects of the present disclosure.

DETAILED DESCRIPTION

Figure 1:
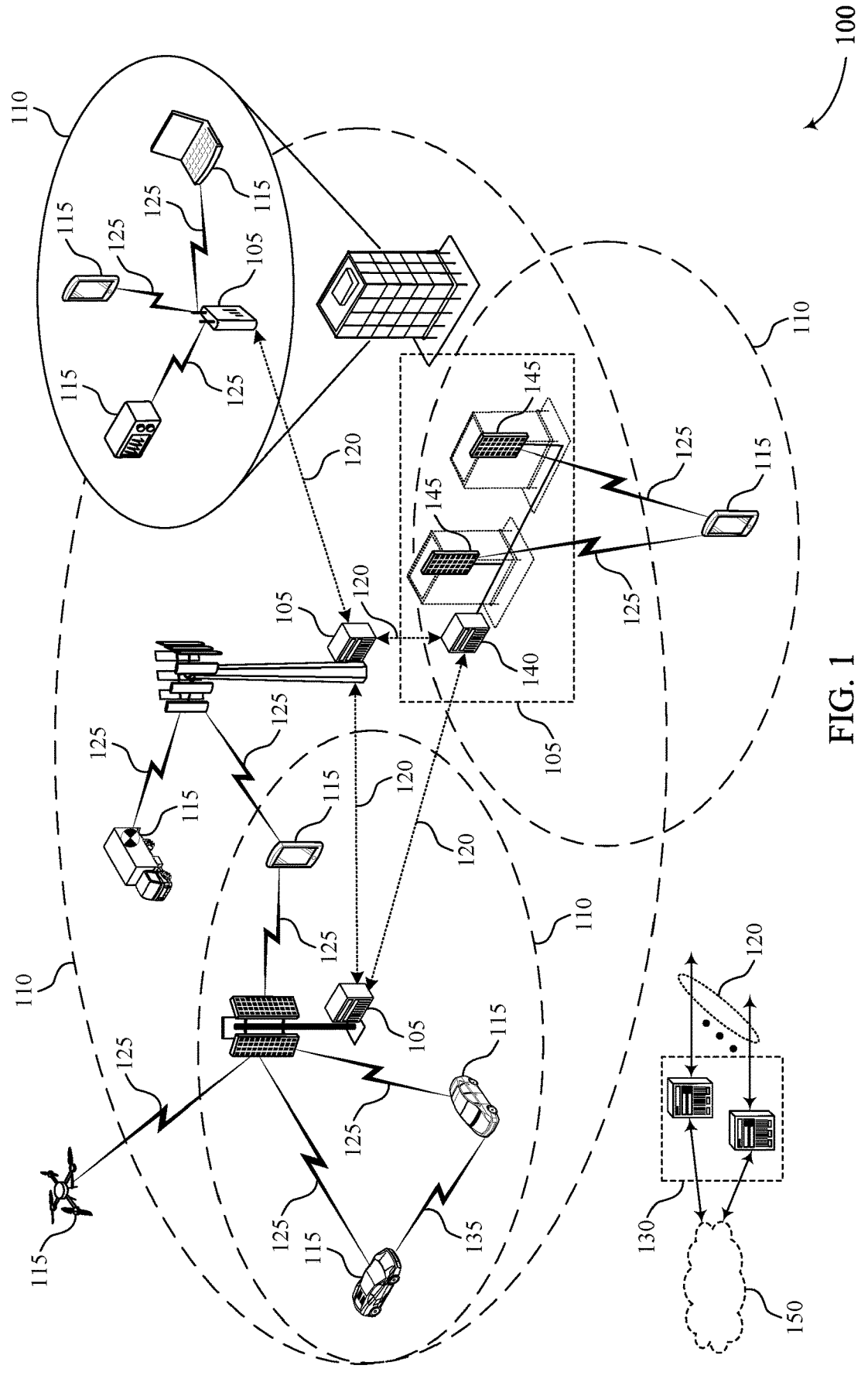
FIG. 1 illustrates an example of a wireless communications system that supports techniques for detecting blockage conditions in accordance with aspects of the present disclosure.

In some wireless communications systems, such as millimeter wave (mmW) systems or systems operating beyond mmW frequencies, a user equipment (UE) may communicate with a base station using beamforming techniques, which may also be referred to as spatial filtering, directional transmission, or directional reception. However, blockage may impact link performance in mmW systems or higher-frequency systems. A blockage may be due to a human body (e.g., hands, fingers, or other body parts) or an external object (e.g., other people, vehicles, buildings, foliage, or another object) blocking a path of a beam between the UE and the base station. It may be beneficial to efficiently predict an arrival or departure of a blockage to improve communication reliability.

According to the techniques described herein, a UE may detect and report blockage conditions based on measuring signal strengths of reference signals. A UE may determine a slew rate for the signal strength, corresponding to a rate of change (e.g., with respect to time) of a signal strength parameter (e.g., a reference signal received power (RSRP), a received signal strength indicator (RSSI), a reference signal received quality (RSRQ), a signal-to-noise ratio (SNR), a signal-to-interference-and-noise ratio (SINR), or another signal strength parameter), and report the slew rate to a base station to indicate signal strength degradation (e.g., due to the arrival or presence of a blockage condition) or signal strength improvement (e.g., due to the departure or removal of the blockage condition).

In some examples, the UE may define multiple slew rates associated with different rates of change of the signal strength parameter with time. When the UE crosses a level of slew rate (e.g., a slew rate threshold), the UE may indicate this to the base station to initiate appropriate resources for mitigating the impact of the blockage condition. For example, when the UE crosses a first (e.g., lowest) slew rate threshold, the base station may assign resources for the UE to monitor for reference signals to identify alternate beam pairs to address the blockage condition. If the UE crosses a second slew rate threshold, the base station may switch to operating using a different beam and use the resources indicated upon crossing the first slew rate to allow the UE to determine an alternative beam. If the UE crosses a third slew rate threshold, the UE may switch to a different beam for communicating with the base station, either a previously determined beam or a beam identified based on the monitoring the reference signals. In some examples, the techniques described herein may be extended to reporting slew rates for multiple beams and for multiple slew rate settings.

Aspects of the disclosure are initially described in the context of wireless communications systems. Aspects of the disclosure are further illustrated by and described with reference to a signal strength diagram, a process flow, apparatus diagrams, system diagrams, and flowcharts that relate to techniques for detecting blockage conditions.

FIG. 1 illustrates an example of a wireless communications system 100 that supports techniques for detecting blockage conditions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, repeater devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As described herein, a UE 115 may detect and report blockage conditions based on measuring signal strengths of reference signals. The UE 115 may determine a slew rate for the signal strength, corresponding to a rate of change (e.g., with respect to time) of a signal strength parameter (e.g., an RSRP, an RSSI, an RSRQ, an SNR, and SINR, or another signal strength parameter), and report the slew rate to a base station 105 to indicate signal strength degradation (e.g., due to the arrival or presence of a blockage condition) or signal strength improvement (e.g., due to the departure or removal of the blockage condition).

In some examples, the UE 115 may define multiple slew rates associated with different rates of change of the signal strength parameter with time. When the UE 115 crosses a level of slew rate (e.g., a slew rate threshold), the UE 115 may indicate this to the base station 105 to initiate appropriate resources for mitigating the impact of the blockage condition. For example, when the UE 115 crosses a first (e.g., lowest) slew rate threshold, the base station 105 may assign resources for the UE 115 to monitor for reference signals to identify alternate beam pairs to address the blockage condition. If the UE 115 crosses a second slew rate threshold, the base station 105 may switch to operating using a different beam and use the resources indicated upon crossing the first slew rate to allow the UE 115 to determine an alternative beam. If the UE 115 crosses a third slew rate threshold, the UE 115 may switch to a different beam for communicating with the base station 105, either a previously determined beam or a beam identified based on the monitoring the reference signals. In some examples, the techniques described herein may be extended to the UE 115 reporting slew rates for multiple beams and for multiple slew rate thresholds.

Figure 2:
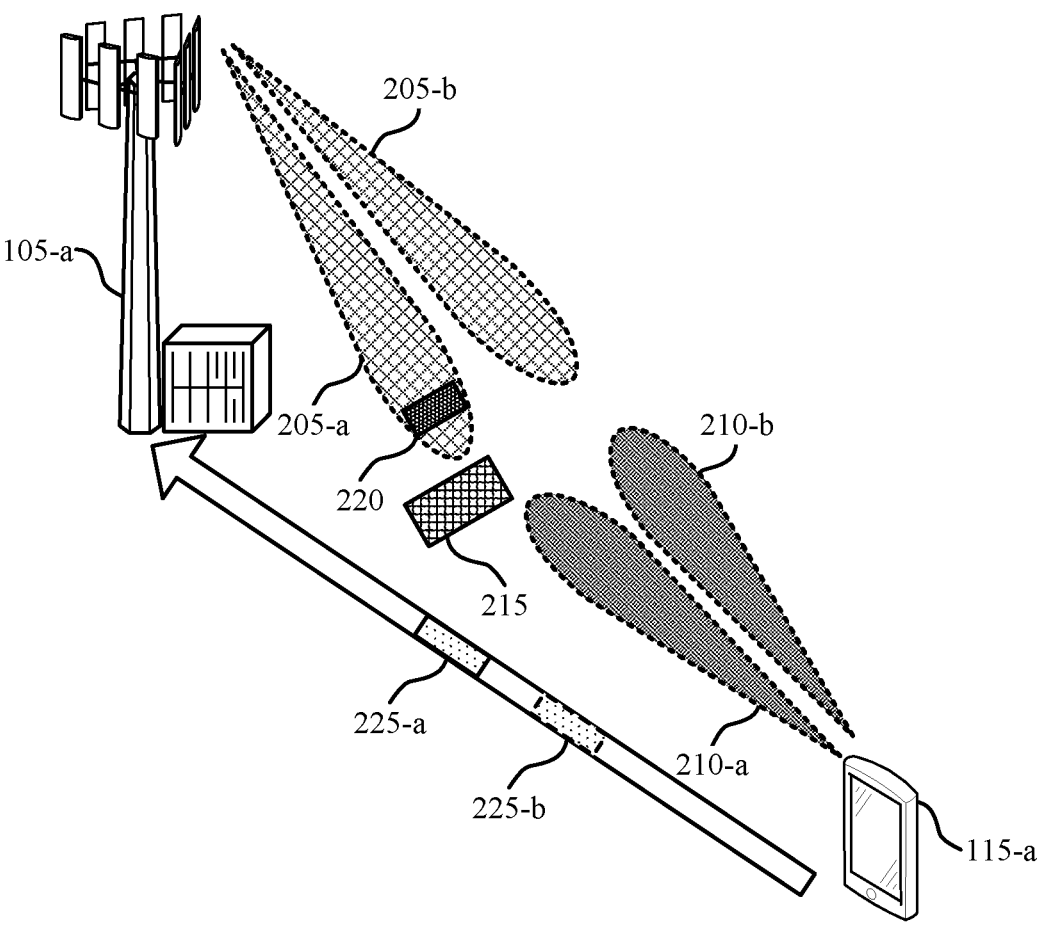
FIG. 2 illustrates an example of a wireless communications system that supports techniques for detecting blockage conditions in accordance with aspects of the present disclosure.
Figure 2:
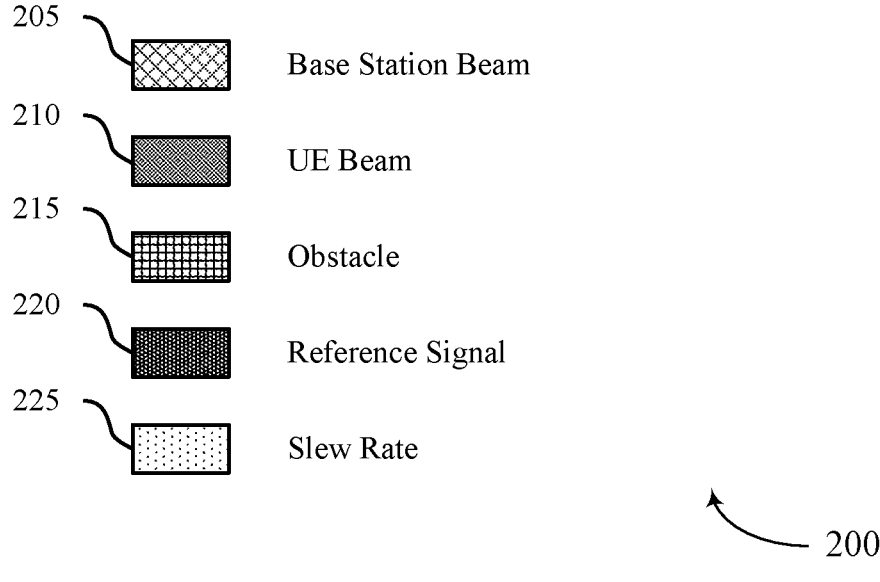

FIG. 2 illustrates an example of a wireless communications system 200 that supports techniques for detecting blockage conditions in accordance with aspects of the present disclosure. In some examples, the wireless communications system 200 may implement aspects of the wireless communications system 100. For example, the wireless communications system 200 may include a base station 105-a and a UE 115-a, which may be examples of the corresponding devices described with reference to FIG. 1. The wireless communications system 200 may include features for improved beamforming procedures between the UE 115-a and the base station 105-a. For example, the UE 115-a and the base station 105-a may operate in accordance with a beamforming procedure for multiple beams that the wireless devices may use for wireless communication, such as UE beams 210 or base station beams 205.

The base station 105-a may communicate with the UE 115-a using beamforming techniques, for example in a mmW system or a Frequency Range 2 (FR2) system, or at frequencies beyond FR2 such as Frequency Range 4 (FR4) or Frequency Range 5 (FR5). The base station 105-a may transmit control signaling to the UE 115-a to initialize a beam sweep procedure, in which the base station 105-a and the UE 115-a may identify one or more base station beams 205 and one or more UE beams 210 for beamformed communications based on the beam sweep procedure. For example, the base station 105-a and the UE 115-a may select base station beams 205-a and 205-b from a set of base station beams 205 based on the beam sweep procedure. Similarly, the base station 105-a and the UE 115-a may select UE beams 210-a and 210-b from a set of UE beams 210 based on the beam sweep procedure.

Individual base station beams 205 may correspond to individual UE beams 210 for communications in the wireless communications system 200. In some examples, the communications illustrated in FIG. 2 may include downlink transmissions to the UE 115-a, in which the base station beams 205 may be transmission beams and the UE beams 210 may be reception beams. Additionally or alternatively, the communications illustrated in FIG. 2 may include uplink transmissions from the UE 115-a, in which the base station beams 205 may be reception beams and the UE beams 210 may be transmission beams.

In some cases, blockage or fading may reduce link performance in the communications between the UE 115-a and the base station 105-a. For example, an obstacle 215 (e.g., a human body or another object) may block a path between the base station beam 205-a and the UE beam 210-a. An onset of the blockage may be relatively slow or relatively fast (e.g., on the order of tens of ms or hundreds of ms) and the blockage may degrade link performance (e.g., by 2-40 decibels (dB)) based on a type of the blockage. It may be beneficial to efficiently predict an arrival or departure of an obstacle 215 to improve communication reliability.

According to the techniques described herein, the UE 115-a may detect and report blockage conditions based on measuring signal strengths of reference signals 220. The UE 115-a may determine a slew rate 225-a for the signal strength, corresponding to a rate of change (e.g., with respect to time) of a signal strength parameter (e.g., an RSRP, an RSSI, or another signal strength parameter). For example, a 25 dB change in the signal strength parameter over 100 ms may correspond to a slew rate 225-a of 250 dB/second, though the change may not be sustained for timescales on the order of a second. In some examples, the signal strength parameter may be filtered (e.g., Layer 1 (L1) filtered) to improve resolution and more reliably capture changes in the signal strength parameter. The signal strength parameter may be filtered using a filter coefficient (which may be denoted as a) that may be selected or configured at the UE 115-a. For example, if the signal strength parameter is an RSSI associated with the reference signals 220, the UE 115-a may iteratively determine a filtered RSSI according to the formula:

$$RSSI_{filtered}(n) = (1 - \alpha)RSSI_{filtered}(n-1) + \alpha \cdot RSSI_{measured}. \quad (1)$$

The UE 115-a may report the slew rate 225-a to the base station 105-a to indicate signal strength degradation or improvement (e.g., due to the arrival or departure of the obstacle 215). In some examples, the UE 115-a may define multiple slew rates 225 associated with different rates of change of the signal strength parameter with time. For example, a relatively low slew rate 225-a (e.g., 10 dB/100 ms) may correspond to a slow signal strength degradation (e.g., due to a loose hand grip), and a relatively high slew rate 225-b (e.g., 40 dB/100 ms) may correspond to a fast signal strength degradation (e.g., due to a hard hand grip that blocks all the antenna elements at the UE 115-a with negligible or no air gaps between fingers).

In some examples, when the UE 115-a crosses a slew rate threshold, the UE 115-a may indicate this to the base station 105-a to initiate appropriate resources for mitigating the impact of the blockage. For example, when the UE 115-a crosses a first (e.g., lowest) slew rate threshold, the base station 105-a may assign resources for the UE 115-a to monitor for reference signals 220 to identify alternate UE beams 210 (e.g., the UE beam 210-b) to address the blockage. If the UE 115-a crosses a second slew rate threshold, the base station 105-a may switch to operating using a different base station beam 205 (e.g., the base station beam 205-b) and use the resources indicated upon crossing the first slew rate threshold to allow the UE 115-a to determine an alternative UE beam 210. If the UE 115-*a* crosses a third slew rate threshold, the UE 115-*a* may switch to a different UE beam 210 (e.g., the UE beam 210-*b*) for communicating with the base station 105-*a*, either a previously determined UE beam 210 or a UE beam 210 identified based on the monitoring of the reference signals 220.

In some examples, the techniques described herein may be extended to the UE 115-*a* reporting slew rates 225 for multiple UE beams 210. For example, the UE 115-*a* may be configured to report respective signal strength parameters for a quantity of UE beams 210 (e.g., two UE beams 210) with the greatest signal strengths, such as in an L1 report. The UE 115-*a* may be further configured to report respective slew rates 225 for the quantity of UE beams 210. For example, the UE 115-*a* may report the slew rate 225-*a* corresponding to the UE beam 210-*a* and the slew rate 225-*b* corresponding to the UE beam 210-*b*. The UE 115-*a* may report a respective quantity of bits (e.g., B bits) for indicating each of the slew rates 225. For example, the UE may be configured to report two bits per beam, where the two bits may indicate one of four states (e.g., states indicating no drop in the signal strength parameter, first slew rate threshold crossed, second slew rate threshold crossed, or third slew rate threshold crossed) corresponding to the slew rate 225.

Figure 3:
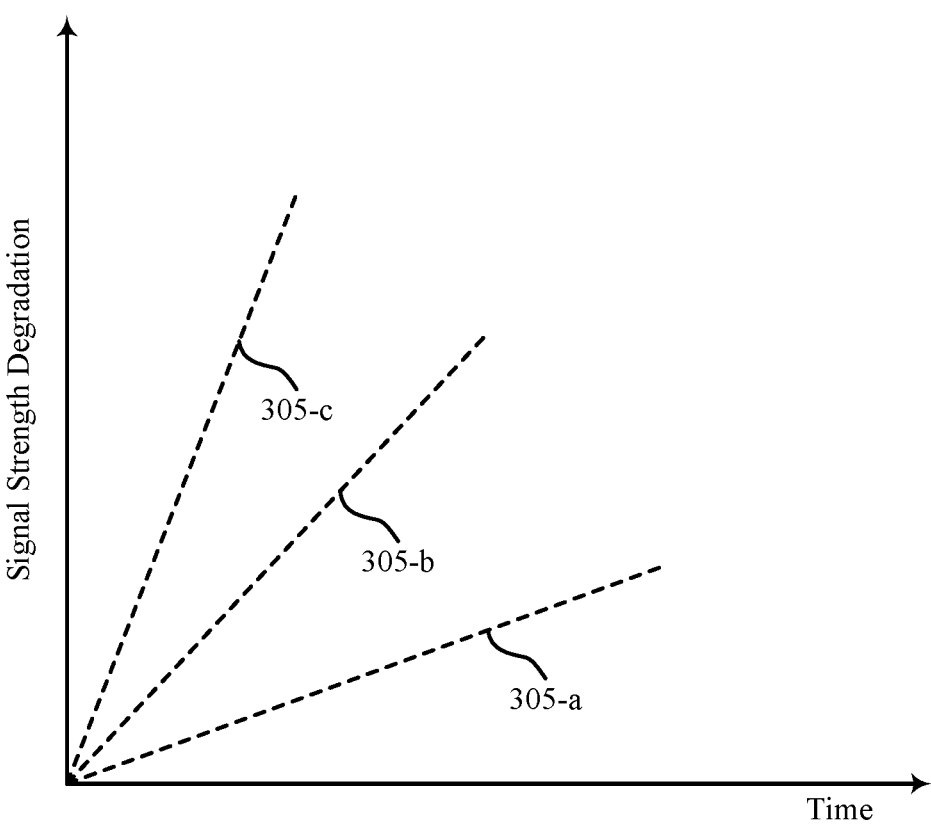
FIG. 3 illustrates an example of a signal strength diagram that supports techniques for detecting blockage conditions in accordance with aspects of the present disclosure.
Figure 3:
Figure 3:

FIG. 3 illustrates an example of a signal strength diagram 300 that supports techniques for detecting blockage conditions in accordance with aspects of the present disclosure. In some examples, the signal strength diagram 300 may implement aspects of wireless communications systems 100 and 200. For example, the signal strength diagram 300 may illustrate signal strength degradation as a function of time, where the signal strength degradation may correspond to communications between a UE and a base station, which may be examples of corresponding devices described with reference to FIGS. 1 and 2. The signal strength diagram 300 may include features for improved communication reliability, among other benefits.

As described herein, a UE may detect and report blockage conditions based on measuring signal strengths of reference signals. The UE may determine a slew rate for the signal strength, corresponding to a rate of change (e.g., with respect to time) of a signal strength parameter (e.g., an RSRP, an RSSI, or another signal strength parameter), and report the slew rate to a base station to indicate signal strength degradation (e.g., due to a blockage).

In some examples, the UE and the base station may coordinate to establish a slew rate setting (e.g., a configuration) for the communications. The slew rate setting may include one or more slew rate thresholds 305 and configure signaling for indicating signal strength degradation when the degradation crosses the slew rate thresholds 305. In some examples, the UE may indicate the slew rate setting to the base station, or the base station may indicate the slew rate setting to the UE. In some examples, the UE may indicate a capability (e.g., a beam switching capability, a reporting capability, or another capability) associated with determining or reporting the slew rate, and the slew rate setting may be based on the indicated capability.

In some examples, when the UE crosses a slew rate threshold 305, the UE may indicate this to the base station to initiate appropriate resources for mitigating the impact of the blockage. For example, when the UE crosses a slew rate threshold 305-*a* (e.g., a lowest slew rate threshold 305-*a*, which may be referred to as Slew rate$_1$), the base station may assign resources for the UE to monitor for reference signals to identify alternate UE beams to address the blockage. If the UE crosses a slew rate threshold 305-*b* (which may be referred to as Slew rate$_2$), the base station may switch to operating using a different base station beam and use the resources indicated upon crossing the slew rate threshold 305-*a* to allow the UE to determine an alternative UE beam. If the UE crosses a slew rate threshold 305-*c* (e.g., a highest slew rate threshold 305-*c*, which may be referred to as Slew rate$_3$), the UE may switch to using a different UE beam for communicating with the base station, either a previously determined UE beam or a UE beam identified based on the monitoring the reference signals. In some examples, the signal strength at the UE may improve, from example from the slew rate threshold 305-*b* to the slew rate threshold 305-*a*. Accordingly, the UE or the base station (or both) may perform a preemptive beam switch to improve channel conditions or link rates.

In some examples, the techniques described herein may be extended to the UE reporting slew rates for multiple UE beams. For example, the UE may be configured to report respective signal strength parameters for a quantity of UE beams (e.g., two UE beams) with the greatest signal strengths, such as in an L1 report. The UE may be further configured to report respective slew rates for the quantity of UE beams. The UE may report a respective quantity of bits (e.g., B bits) for indicating the slew rate characterization for each beam. For example, the UE may be configured to report two bits per beam, where the two bits may indicate one of four states (e.g., states indicating no drop in the signal strength parameter, slew rate threshold 305-*a* crossed, slew rate threshold 305-*b* crossed, or slew rate threshold 305-*c* crossed) corresponding to the slew rate.

Figure 4:
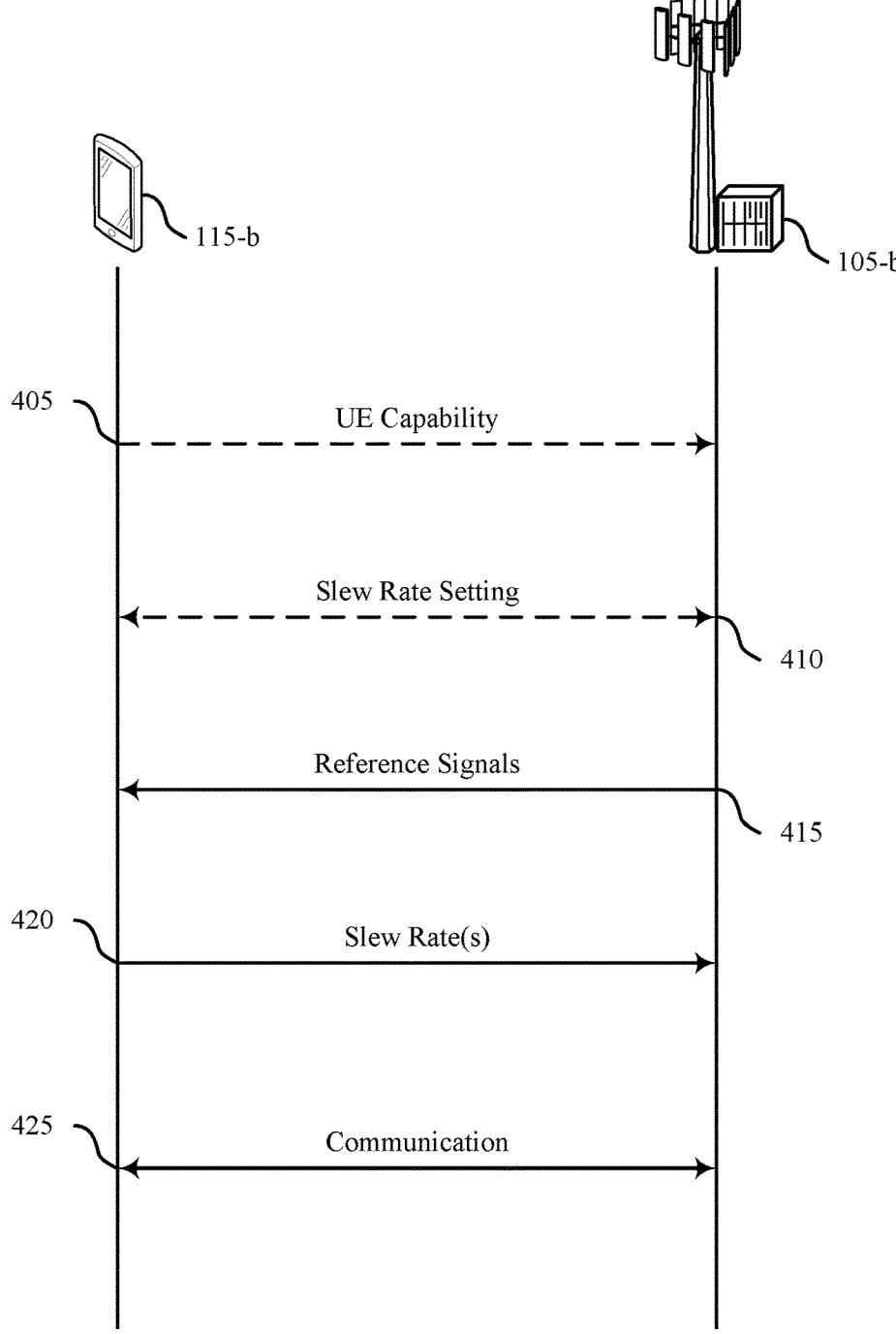
FIG. 4 illustrates an example of a process flow that supports techniques for detecting blockage conditions in accordance with aspects of the present disclosure.

FIG. 4 illustrates an example of a process flow 400 that supports techniques for detecting blockage conditions in accordance with aspects of the present disclosure. In some examples, the process flow 400 may implement aspects of wireless communications systems 100 and 200. For example, the process flow 400 may include example operations associated with one or more of a base station 105-*b* or a UE 115-*b*, which may be examples of the corresponding devices described with reference to FIGS. 1 and 2. In the following description of the process flow 400, the operations between the base station 105-*b* and the UE 115-*b* may be performed in a different order than the example order shown, or the operations performed by the base station 105-*b* and the UE 115-*b* may be performed in different orders or at different times. Some operations may also be omitted from the process flow 400, and other operations may be added to the process flow 400. The operations performed by the base station 105-*b* and the UE 115-*b* may support improvement to the UE 115-*b* network access operations and, in some examples, may promote improvements to efficiency and reliability for communications between the base station 105-*b* and the UE 115-*b*, among other benefits.

In some examples, at 405, the UE 115-*b* may indicate a capability to the base station 105-*b*. The capability may include at least one of a beam switching capability, or a reporting capability, or another capability associated with signal strength measurement.

In some examples, at 410, the UE 115-*b* and the base station 105-*b* may coordinate to establish a slew rate setting (e.g., a configuration) for the communications. The slew rate setting may include one or more slew rate thresholds and configure signaling for indicating signal strength degradation when the degradation crosses the slew rate thresholds. In some examples, the UE 115-*b* may indicate the slew rate setting to the base station 105-*b*, or the base station 105-*b* may indicate the slew rate setting to the UE 115-*b*.

At 415, the base station 105-*b* may transmit a set of reference signals to the UE 115-*b*. In some examples, the base station 105-*b* may transmit the set of reference signals according to the slew rate setting. Based on monitoring for the set of reference signals, the UE 115-*b* may determine a slew rate corresponding to a rate of change (e.g., with respect to time) of a signal strength parameter (e.g., an RSRP, an RSSI, or another signal strength parameter) associated with the set of reference signals. In some examples, the signal strength parameter may be filtered (e.g., L1 filtered) to improve resolution and more reliably capture changes in the signal strength parameter.

At 420, the UE 115-*b* may indicate the slew rate to the base station 105-*b* to indicate signal strength degradation (e.g., due to the blockage). In some examples, according to the slew rate setting, the UE 115-*b* may indicate when the slew rate crosses a slew rate threshold. In some examples, the UE 115-*b* may report slew rates for multiple UE beams, such as in one or more bits of an L1 report.

At 425, the UE 115-*b* and the base station 105-*b* may communicate based on indicating the slew rate and according to the slew rate setting. For example, when the UE 115-*b* crosses a first (e.g., lowest) slew rate threshold, the base station 105-*b* may assign resources for the UE 115-*b* to monitor reference signal resources to identify alternate UE beams to address the blockage. If the UE 115-*b* crosses a second slew rate threshold, the base station 105-*b* may switch to operating using a different base station beam and use the resources indicated upon crossing the first slew rate threshold to allow the UE 115-*b* to determine an alternative UE beam. If the UE 115-*b* crosses a third slew rate threshold, the UE 115-*b* may switch to a different UE beam for communicating with the base station 105-*a*, either a previously determined UE beam or a UE beam identified based on the monitoring the reference signal resources. By implementing one or more of the described techniques for detecting and mitigating blockage conditions, the UE 115-*b* and the base station 105-*b* may be able to communicate more reliably, among other benefits.

Figure 5:
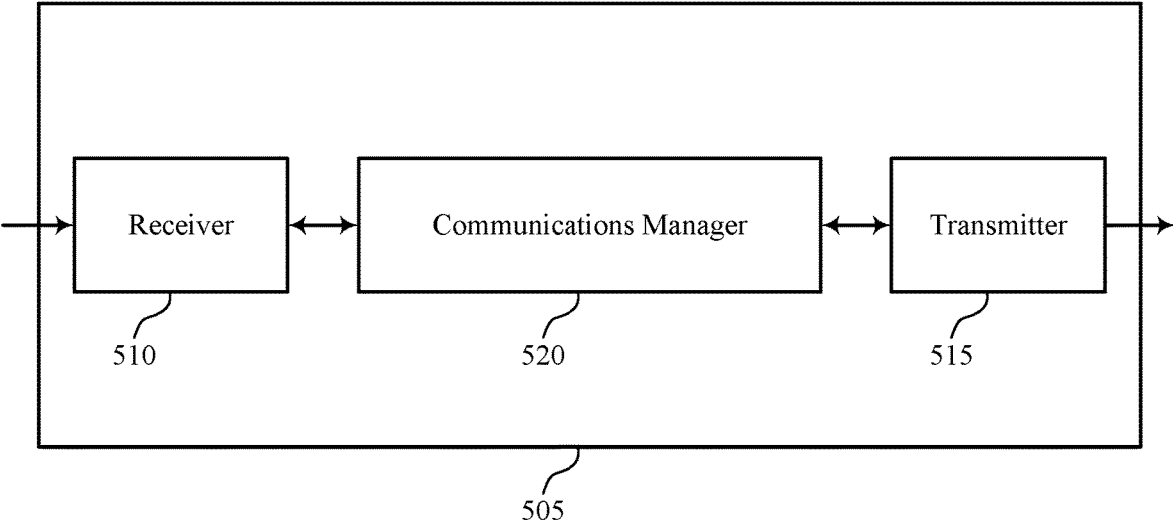
FIGS. 5 and 6 show block diagrams of devices that support techniques for detecting blockage conditions in accordance with aspects of the present disclosure.

FIG. 5 shows a block diagram 500 of a device 505 that supports techniques for detecting blockage conditions in accordance with aspects of the present disclosure. The device 505 may be an example of aspects of a UE 115 as described herein. The device 505 may include a receiver 510, a transmitter 515, and a communications manager 520. The device 505 may also include one or more processors, memory coupled with the one or more processors, and instructions stored in the memory that are executable by the one or more processors to enable the one or more processors to perform the blockage detection features discussed herein. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for detecting blockage conditions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for detecting blockage conditions). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for detecting blockage conditions as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, a set of reference signals over a link between the base station and the UE. The communications manager 520 may be configured as or otherwise support a means for transmitting a signal indicating a slew rate associated with the link, where the slew rate includes a rate of change of a signal strength parameter associated with the set of reference signals with respect to time, and where the signal indicating the slew rate is transmitted based on a slew rate setting associated with the link. The communications manager 520 may be configured as or otherwise support a means for communicating with the base station based on transmitting the signal and according to the slew rate setting.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, more consistent beam service, faster and more accurate reaction to varying wireless conditions, and a more efficient utilization of communication resources.

Figure 6:
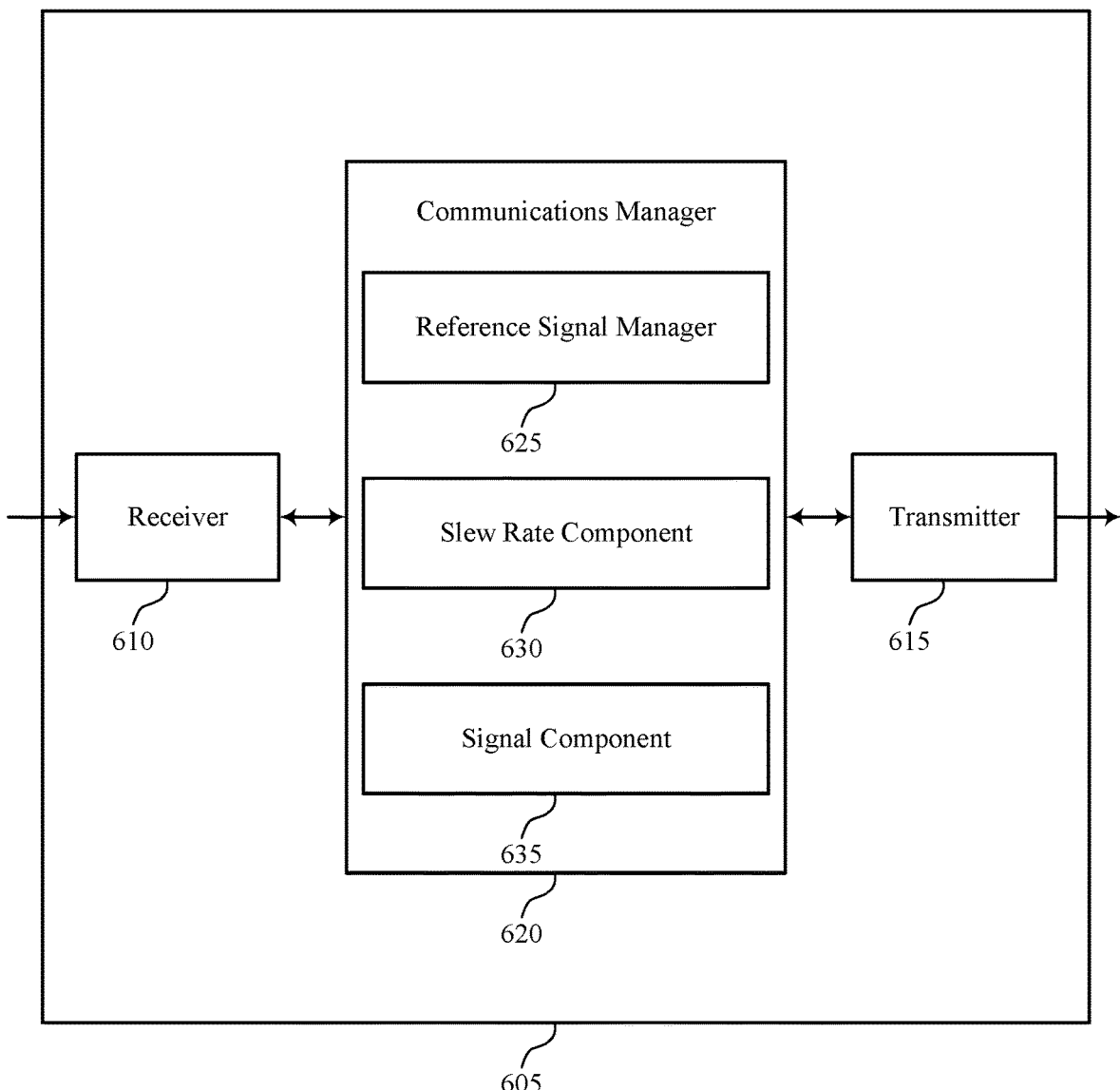

FIG. 6 shows a block diagram 600 of a device 605 that supports techniques for detecting blockage conditions in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for detecting blockage conditions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for detecting blockage conditions). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for detecting blockage conditions as described herein. For example, the communications manager 620 may include a reference signal manager 625, a slew rate component 630, a signal component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The reference signal manager 625 may be configured as or otherwise support a means for receiving, from a base station, a set of reference signals over a link between the base station and the UE. The slew rate component 630 may be configured as or otherwise support a means for transmitting a signal indicating a slew rate associated with the link, where the slew rate includes a rate of change of a signal strength parameter associated with the set of reference signals with respect to time, and where the signal indicating the slew rate is transmitted based on a slew rate setting associated with the link. The signal component 635 may be configured as or otherwise support a means for communicating with the base station based on transmitting the signal and according to the slew rate setting.

In some cases, the reference signal manager 625, the slew rate component 630, and the signal component 635 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the reference signal manager 625, the slew rate component 630, and the signal component 635 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
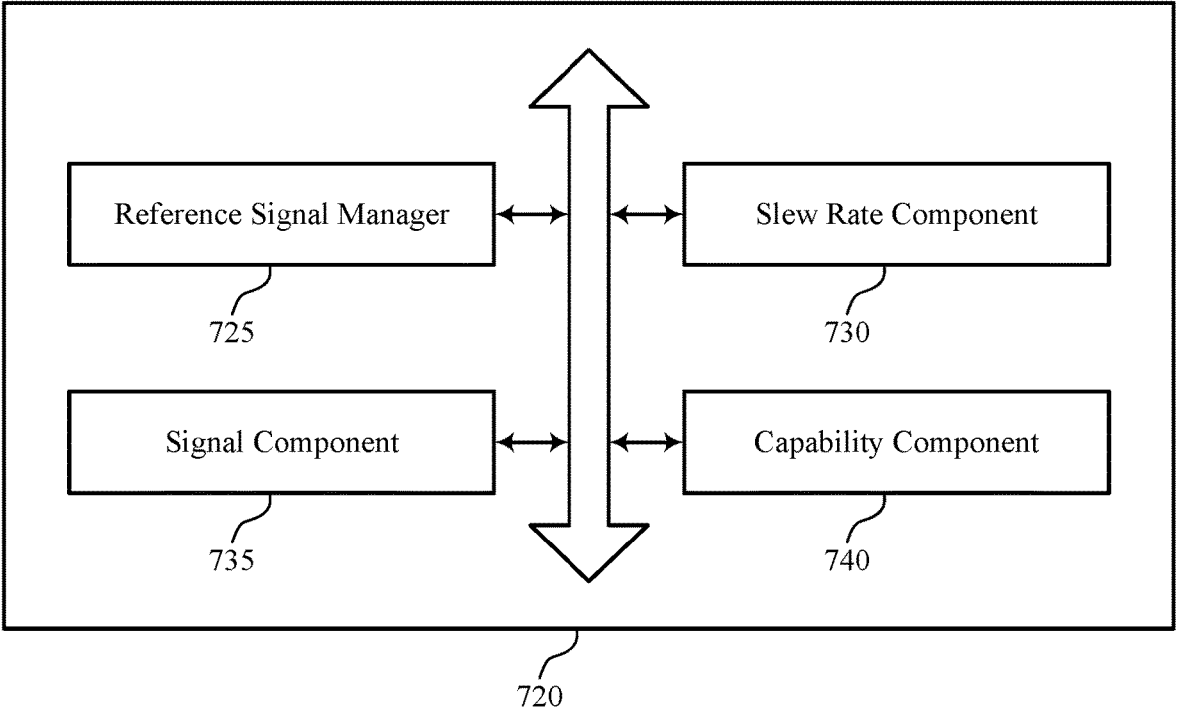
FIG. 7 shows a block diagram of a communications manager that supports techniques for detecting blockage conditions in accordance with aspects of the present disclosure.

FIG. 7 shows a block diagram 700 of a communications manager 720 that supports techniques for detecting blockage conditions in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for detecting blockage conditions as described herein. For example, the communications manager 720 may include a reference signal manager 725, a slew rate component 730, a signal component 735, a capability component 740, or any combination thereof. Each of these components may communicate, directly or indirectly, with one another (e.g., via one or more buses).

The communications manager 720 may support wireless communication at a UE in accordance with examples as disclosed herein. The reference signal manager 725 may be configured as or otherwise support a means for receiving, from a base station, a set of reference signals over a link between the base station and the UE. The slew rate component 730 may be configured as or otherwise support a means for transmitting a signal indicating a slew rate associated with the link, where the slew rate includes a rate of change of a signal strength parameter associated with the set of reference signals with respect to time, and where the signal indicating the slew rate is transmitted based on a slew rate setting associated with the link. The signal component 735 may be configured as or otherwise support a means for communicating with the base station based on transmitting the signal and according to the slew rate setting.

In some examples, the slew rate component 730 may be configured as or otherwise support a means for receiving, from the base station, a second signal indicating the slew rate setting, where the signal indicating the slew rate is transmitted based on receiving the second signal.

In some examples, the slew rate component 730 may be configured as or otherwise support a means for transmitting, to the base station, a second signal indicating the slew rate setting, where the signal indicating the slew rate is transmitted based on transmitting the second signal.

In some examples, the capability component 740 may be configured as or otherwise support a means for transmitting, to the base station, a second signal indicating a UE capability, where the slew rate setting is based on the UE capability.

In some examples, to support communicating with the base station, the signal component 735 may be configured as or otherwise support a means for receiving a second signal indicating one or more reference signal resources. In some examples, to support communicating with the base station, the signal component 735 may be configured as or otherwise support a means for monitoring the one or more reference signal resources according to the slew rate setting and a beam refinement procedure or a beam failure recovery procedure.

In some examples, to support communicating with the base station, the signal component 735 may be configured as or otherwise support a means for receiving a third signal indicating a beam switch at the base station, where monitoring the one or more reference signal resources is further based on receiving the third signal.

In some examples, to support communicating with the base station, the signal component 735 may be configured as or otherwise support a means for switching from a first beam to a second beam for communications with the base station based on monitoring the one or more reference signal resources.

In some examples, to support communicating with the base station, the signal component 735 may be configured as or otherwise support a means for switching from a first beam to a second beam for communications with the base station according to the slew rate setting.

In some examples, the slew rate setting includes one or more slew rate thresholds. In some examples, the signal indicating the slew rate is transmitted based on the slew rate satisfying a slew rate threshold of the one or more slew rate thresholds.

In some examples, the slew rate includes a first slew rate corresponding to a first beam associated with the link. In some examples, the signal further indicates a second slew rate corresponding to a second beam associated with the link.

In some examples, the signal indicates the slew rate in one or more bits of a Layer 1 report.

In some examples, the signal strength parameter is based on at least a received signal strength indicator, or a reference signal received power, or both.

In some cases, the reference signal manager 725, the slew rate component 730, the signal component 735, and the capability component 740 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the reference signal manager 725, the slew rate component 730, the signal component 735, and the capability component 740 discussed herein.

Figure 8:
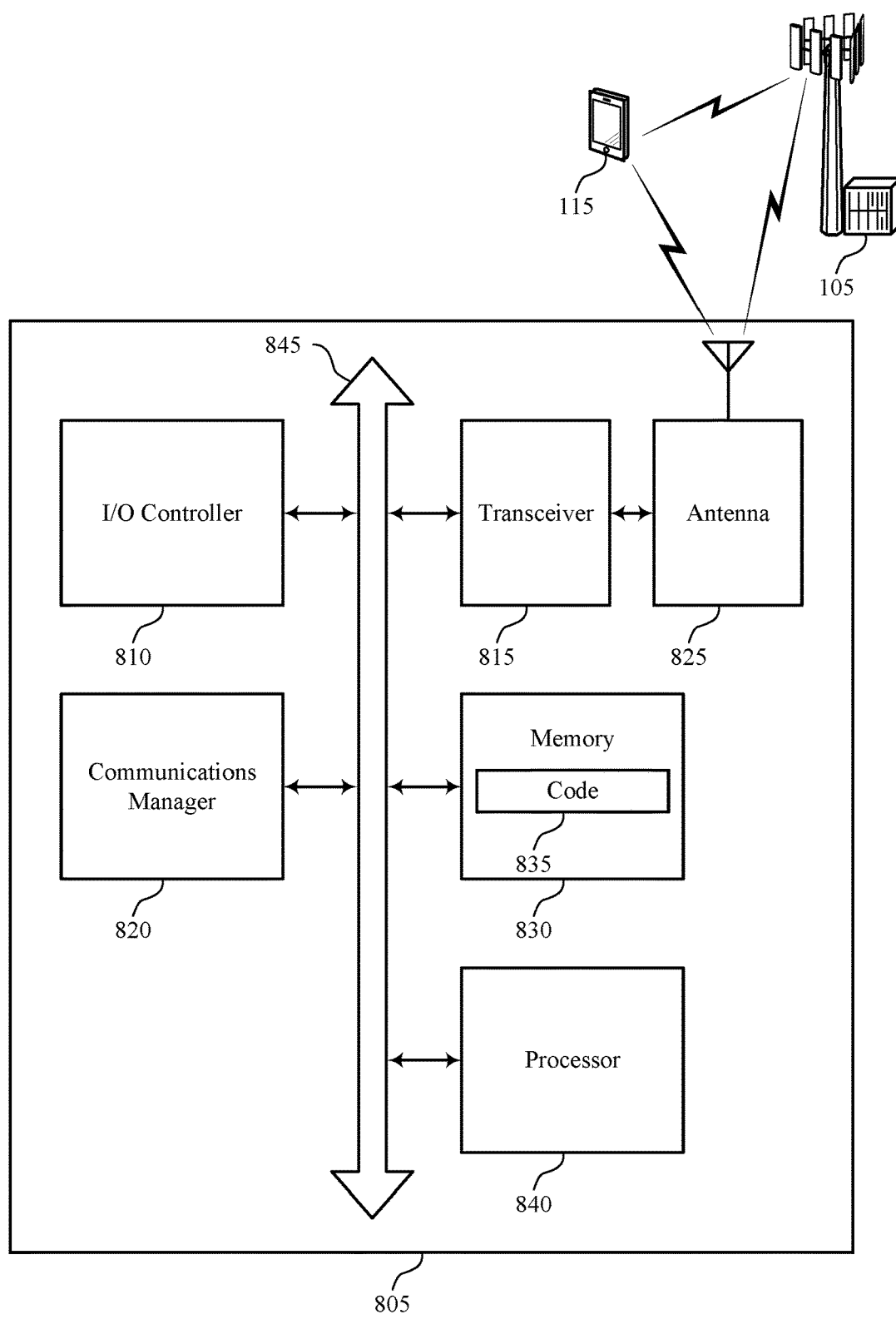
FIG. 8 shows a diagram of a system including a device that supports techniques for detecting blockage conditions in accordance with aspects of the present disclosure.

FIG. 8 shows a diagram of a system 800 including a device 805 that supports techniques for detecting blockage conditions in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for detecting blockage conditions). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, a set of reference signals over a link between the base station and the UE. The communications manager 820 may be configured as or otherwise support a means for transmitting a signal indicating a slew rate associated with the link, where the slew rate includes a rate of change of a signal strength parameter associated with the set of reference signals with respect to time, and where the signal indicating the slew rate is transmitted based on a slew rate setting associated with the link. The communications manager 820 may be configured as or otherwise support a means for communicating with the base station based on transmitting the signal and according to the slew rate setting.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, improved utilization of processing capability, or more consistent beam service.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for detecting blockage conditions as described herein, or the processor 840 and the memory 830 may be otherwise configured to perform or support such operations.

Figure 9:
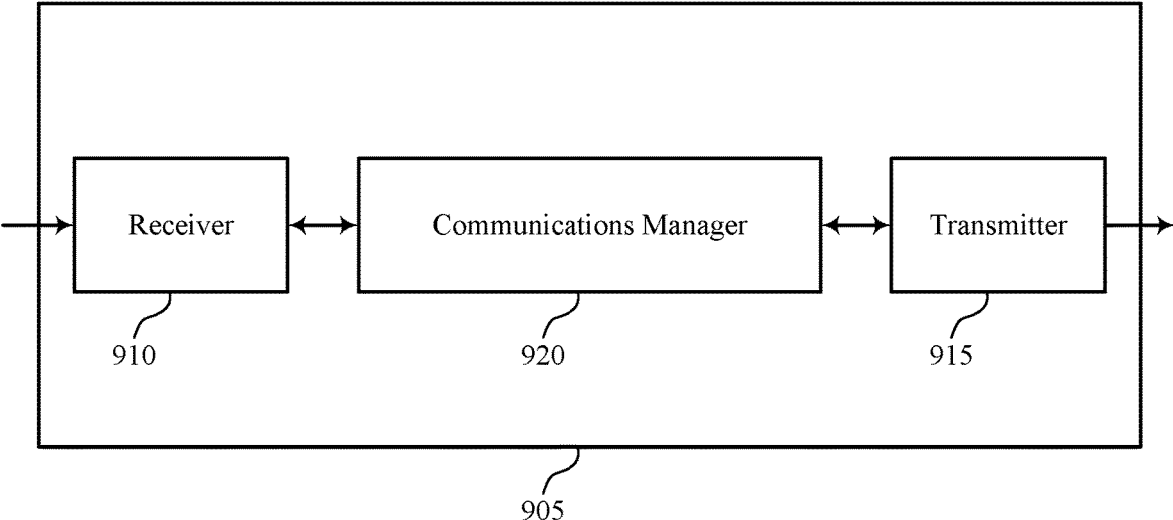
FIGS. 9 and 10 show block diagrams of devices that support techniques for detecting blockage conditions in accordance with aspects of the present disclosure.

FIG. 9 shows a block diagram 900 of a device 905 that supports techniques for detecting blockage conditions in accordance with aspects of the present disclosure. The device 905 may be an example of aspects of a base station 105 as described herein. The device 905 may include a receiver 910, a transmitter 915, and a communications manager 920. The device 905 may also include one or more processors, memory coupled with the one or more processors, and instructions stored in the memory that are executable by the one or more processors to enable the one or more processors to perform the blockage detection features discussed herein. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for detecting blockage conditions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for detecting blockage conditions). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for detecting blockage conditions as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, a set of reference signals over a link between the base station and the UE. The communications manager 920 may be configured as or otherwise support a means for receiving a signal indicating a slew rate associated with the link, where the slew rate includes a rate of change of a signal strength parameter associated with the set of reference signals with respect to time, and where the signal indicating the slew rate is received based on a slew rate setting associated with the link. The communications manager 920 may be configured as or otherwise support a means for communicating with the UE based on receiving the signal and according to the slew rate setting.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, more consistent beam service, faster and more accurate reaction to varying wireless conditions, and a more efficient utilization of communication resources.

Figure 10:
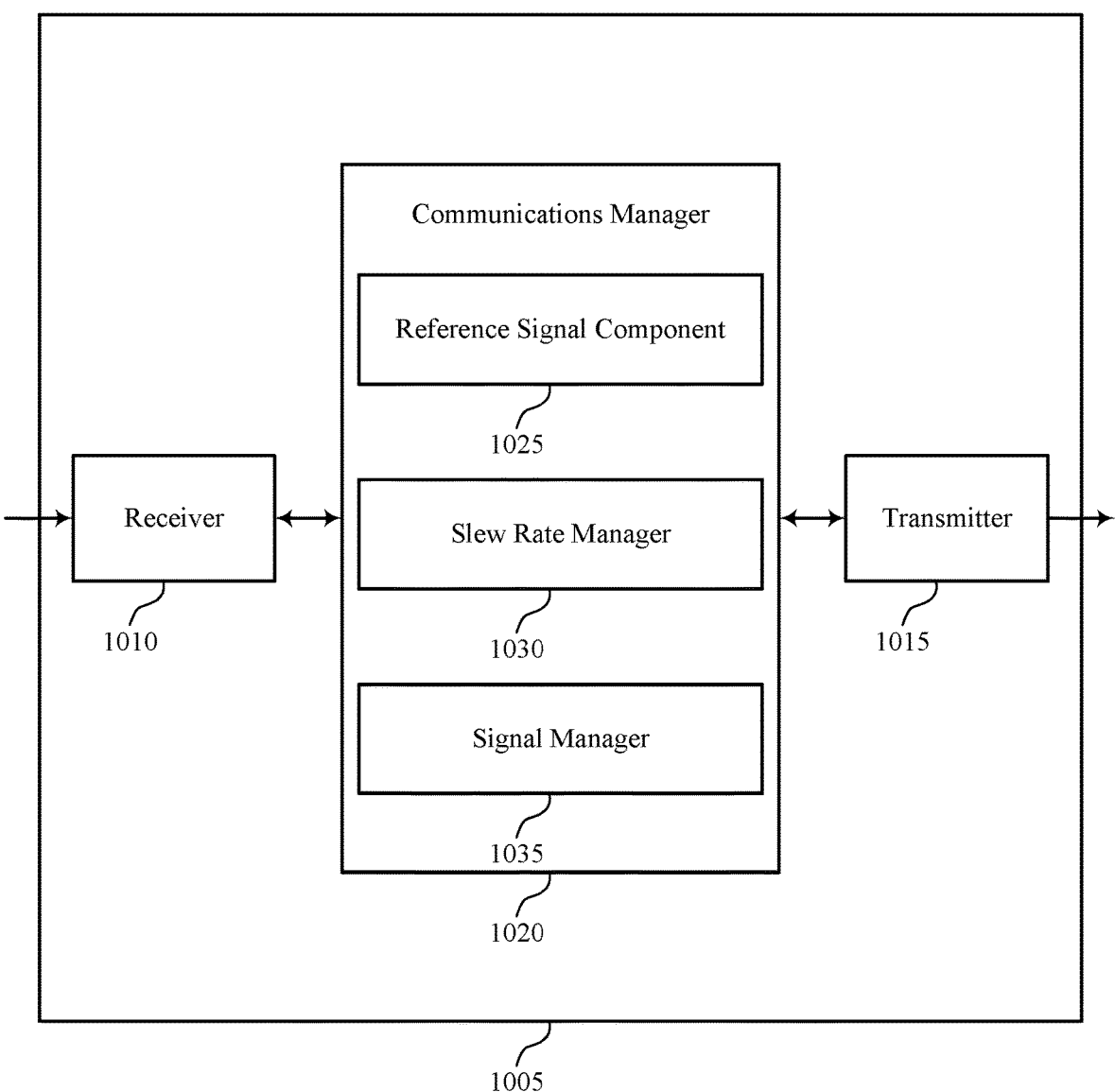

FIG. 10 shows a block diagram 1000 of a device 1005 that supports techniques for detecting blockage conditions in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for detecting blockage conditions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for detecting blockage conditions). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for detecting blockage conditions as described herein. For example, the communications manager 1020 may include a reference signal component 1025, a slew rate manager 1030, a signal manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The reference signal component 1025 may be configured as or otherwise support a means for transmitting, to a UE, a set of reference signals over a link between the base station and the UE. The slew rate manager 1030 may be configured as or otherwise support a means for receiving a signal indicating a slew rate associated with the link, where the slew rate includes a rate of change of a signal strength parameter associated with the set of reference signals with respect to time, and where the signal indicating the slew rate is received based on a slew rate setting associated with the link. The signal manager 1035 may be configured as or otherwise support a means for communicating with the UE based on receiving the signal and according to the slew rate setting.

In some cases, the reference signal component 1025, the slew rate manager 1030, and the signal manager 1035 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the reference signal component 1025, the slew rate manager 1030, and the signal manager 1035 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
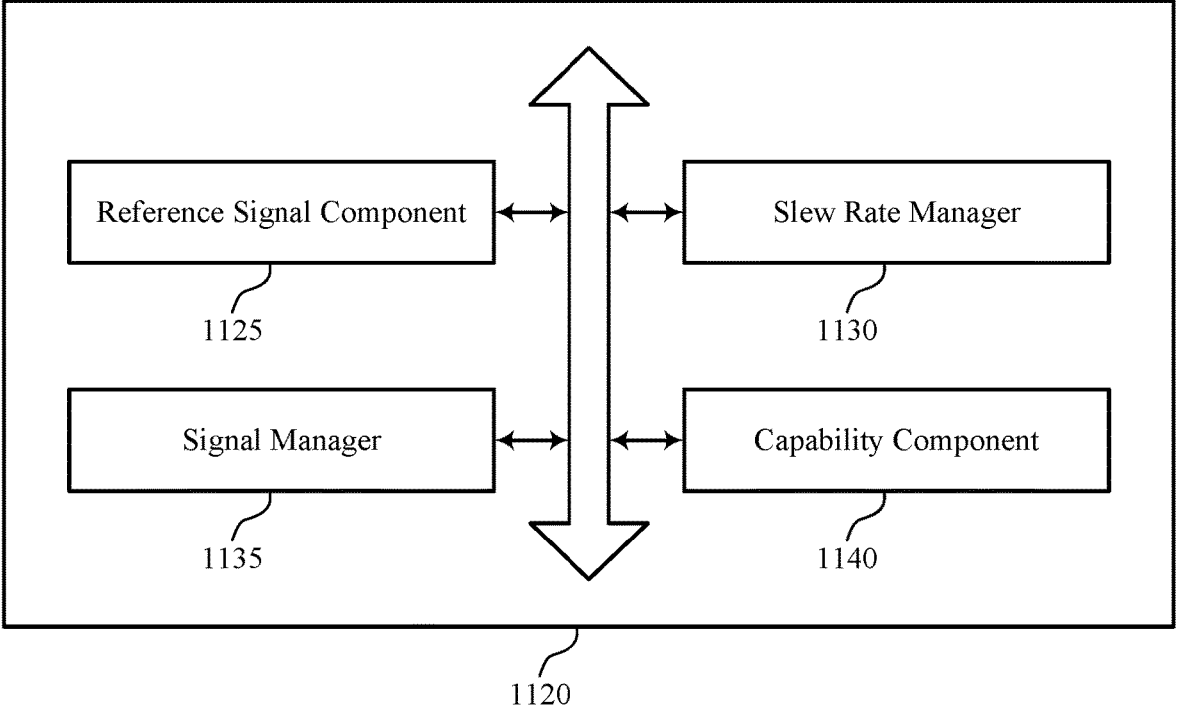
FIG. 11 shows a block diagram of a communications manager that supports techniques for detecting blockage conditions in accordance with aspects of the present disclosure.

FIG. 11 shows a block diagram 1100 of a communications manager 1120 that supports techniques for detecting blockage conditions in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for detecting blockage conditions as described herein. For example, the communications manager 1120 may include a reference signal component 1125, a slew rate manager 1130, a signal manager 1135, a capability component 1140, or any combination thereof. Each of these components may communicate, directly or indirectly, with one another (e.g., via one or more buses).

The communications manager 1120 may support wireless communication at a base station in accordance with examples as disclosed herein. The reference signal component 1125 may be configured as or otherwise support a means for transmitting, to a UE, a set of reference signals over a link between the base station and the UE. The slew rate manager 1130 may be configured as or otherwise support a means for receiving a signal indicating a slew rate associated with the link, where the slew rate includes a rate of change of a signal strength parameter associated with the set of reference signals with respect to time, and where the signal indicating the slew rate is received based on a slew rate setting associated with the link. The signal manager 1135 may be configured as or otherwise support a means for communicating with the UE based on receiving the signal and according to the slew rate setting.

In some examples, the slew rate manager 1130 may be configured as or otherwise support a means for transmitting, to the UE, a second signal indicating the slew rate setting, where the signal indicating the slew rate is received based on transmitting the second signal.

In some examples, the slew rate manager 1130 may be configured as or otherwise support a means for receiving, from the UE, a second signal indicating the slew rate setting, where the signal indicating the slew rate is received based on receiving the second signal.

In some examples, the capability component 1140 may be configured as or otherwise support a means for receiving, from the UE, a second signal indicating a UE capability, where the slew rate setting is based on the UE capability.

In some examples, to support communicating with the UE, the signal manager 1135 may be configured as or otherwise support a means for transmitting a second signal indicating one or more reference signal resources. In some examples, to support communicating with the UE, the signal manager 1135 may be configured as or otherwise support a means for transmitting one or more reference signals in the one or more reference signal resources according to the slew rate setting and a beam refinement procedure or a beam failure recovery procedure.

In some examples, to support communicating with the UE, the signal manager 1135 may be configured as or otherwise support a means for switching from a first beam to a second beam for communications with the UE, where transmitting the one or more reference signals is further based on switching from the first beam to the second beam.

In some examples, to support communicating with the UE, the signal manager 1135 may be configured as or otherwise support a means for receiving a third signal indicating a beam switch at the UE based on transmitting the one or more reference signals.

In some examples, to support communicating with the UE, the signal manager 1135 may be configured as or otherwise support a means for receiving a third signal indicating a beam switch at the UE according to the slew rate setting.

In some examples, the slew rate setting includes one or more slew rate thresholds. In some examples, the signal indicating the slew rate is received based on the slew rate satisfying a slew rate threshold of the one or more slew rate thresholds.

In some examples, the slew rate includes a first slew rate corresponding to a first beam associated with the link. In some examples, the signal further indicates a second slew rate corresponding to a second beam associated with the link.

In some examples, the signal indicates the slew rate in one or more bits of a Layer 1 report.

In some examples, the signal strength parameter is based on at least a received signal strength indicator, or a reference signal received power, or both.

In some cases, the reference signal component 1125, the slew rate manager 1130, the signal manager 1135, and the capability component 1140 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the reference signal component 1125, the slew rate manager 1130, the signal manager 1135, and the capability component 1140 discussed herein.

Figure 12:
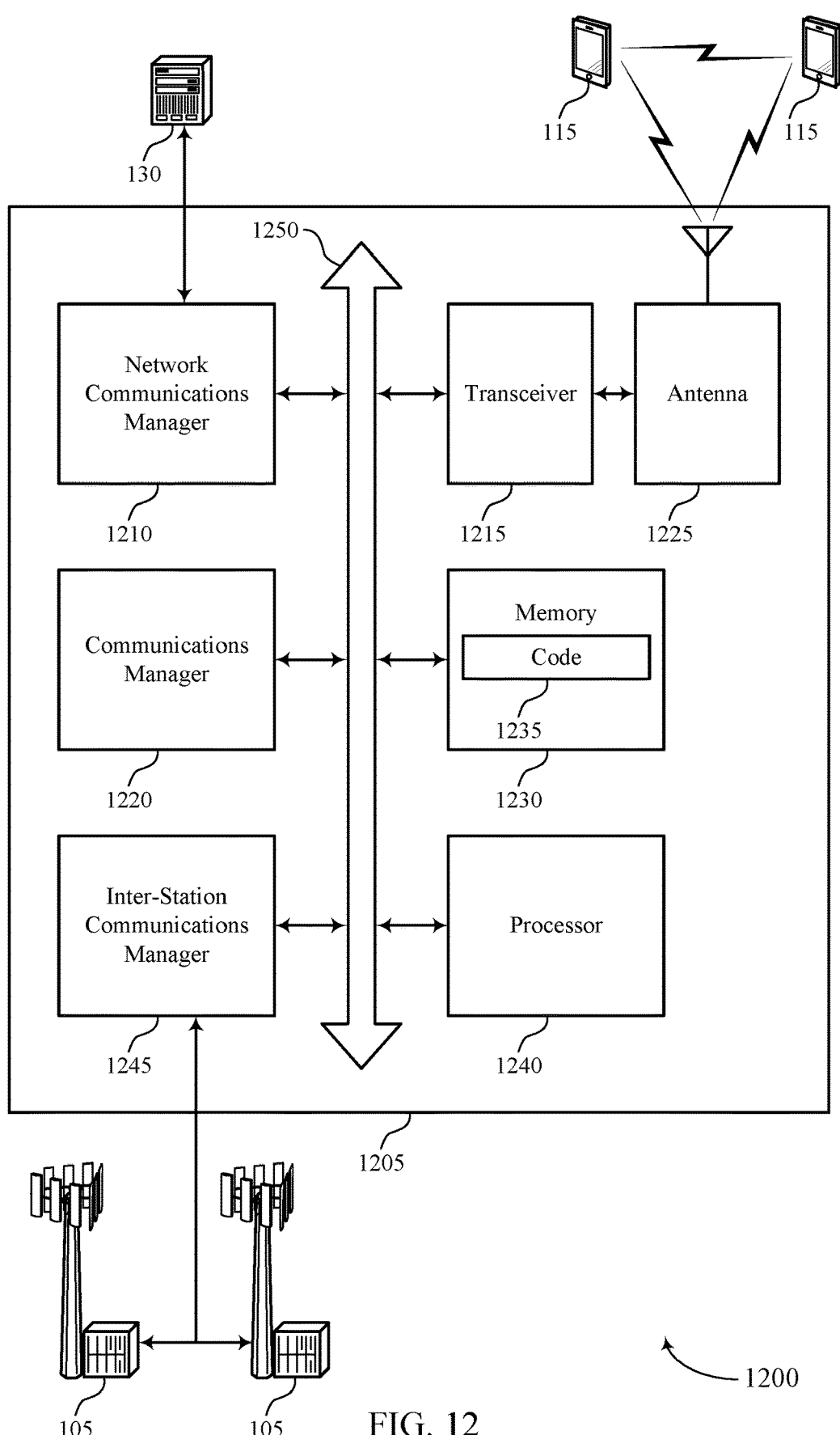
FIG. 12 shows a diagram of a system including a device that supports techniques for detecting blockage conditions in accordance with aspects of the present disclosure.

FIG. 12 shows a diagram of a system 1200 including a device 1205 that supports techniques for detecting blockage conditions in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for detecting blockage conditions). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, a set of reference signals over a link between the base station and the UE. The communications manager 1220 may be configured as or otherwise support a means for receiving a signal indicating a slew rate associated with the link, where the slew rate includes a rate of change of a signal strength parameter associated with the set of reference signals with respect to time, and where the signal indicating the slew rate is received based on a slew rate setting associated with the link. The communications manager 1220 may be configured as or otherwise support a means for communicating with the UE based on receiving the signal and according to the slew rate setting.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, improved utilization of processing capability, or more consistent beam service.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for detecting blockage conditions as described herein, or the processor 1240 and the memory 1230 may be otherwise configured to perform or support such operations.

FIG. 13 shows a flowchart illustrating a method 1300 that supports techniques for detecting blockage conditions in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a set of reference signals over a link between the base station and the UE. The operations of 1305 may be performed in accordance with examples as disclosed herein. In some examples, aspects of the operations of 1305 may be performed by a reference signal manager 725 as described with reference to FIG. 7.

At 1310, the method may include transmitting a signal indicating a slew rate associated with the link, where the slew rate includes a rate of change of a signal strength parameter associated with the set of reference signals with respect to time, and where the signal indicating the slew rate is transmitted based on a slew rate setting associated with the link. The operations of 1310 may be performed in accordance with examples as disclosed herein. In some examples, aspects of the operations of 1310 may be performed by a slew rate component 730 as described with reference to FIG. 7.

At 1315, the method may include communicating with the base station based on transmitting the signal and according to the slew rate setting. The operations of 1315 may be performed in accordance with examples as disclosed herein. In some examples, aspects of the operations of 1315 may be performed by a signal component 735 as described with reference to FIG. 7.

FIG. 14 shows a flowchart illustrating a method 1400 that supports techniques for detecting blockage conditions in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting or receiving a first signal indicating a slew rate setting associated with a link between a base station and the UE. The operations of 1405 may be performed in accordance with examples as disclosed herein. In some examples, aspects of the operations of 1405 may be performed by a slew rate component 730 as described with reference to FIG. 7.

At 1410, the method may include receiving, from the base station, a set of reference signals over the link between the base station and the UE. The operations of 1410 may be performed in accordance with examples as disclosed herein. In some examples, aspects of the operations of 1410 may be performed by a reference signal manager 725 as described with reference to FIG. 7.

At 1415, the method may include transmitting a second signal indicating a slew rate associated with the link, where the slew rate includes a rate of change of a signal strength parameter associated with the set of reference signals with respect to time, and where the second signal indicating the slew rate is transmitted based on transmitting or receiving the first signal indicating the slew rate setting associated with the link. The operations of 1415 may be performed in accordance with examples as disclosed herein. In some examples, aspects of the operations of 1415 may be performed by a slew rate component 730 as described with reference to FIG. 7.

At 1420, the method may include communicating with the base station based on transmitting the second signal and according to the slew rate setting. The operations of 1420 may be performed in accordance with examples as disclosed herein. In some examples, aspects of the operations of 1420 may be performed by a signal component 735 as described with reference to FIG. 7.

FIG. 15 shows a flowchart illustrating a method 1500 that supports techniques for detecting blockage conditions in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, a set of reference signals over a link between the base station and the UE. The operations of 1505 may be performed in accordance with examples as disclosed herein. In some examples, aspects of the operations of 1505 may be performed by a reference signal component 1125 as described with reference to FIG. 11.

At 1510, the method may include receiving a signal indicating a slew rate associated with the link, where the slew rate includes a rate of change of a signal strength parameter associated with the set of reference signals with respect to time, and where the signal indicating the slew rate is received based on a slew rate setting associated with the link. The operations of 1510 may be performed in accordance with examples as disclosed herein. In some examples, aspects of the operations of 1510 may be performed by a slew rate manager 1130 as described with reference to FIG. 11.

At 1515, the method may include communicating with the UE based on receiving the signal and according to the slew rate setting. The operations of 1515 may be performed in accordance with examples as disclosed herein. In some examples, aspects of the operations of 1515 may be performed by a signal manager 1135 as described with reference to FIG. 11.

FIG. 16 shows a flowchart illustrating a method 1600 that supports techniques for detecting blockage conditions in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting or receiving a first signal indicating a slew rate setting associated with a link between the base station and a UE. The operations of 1605 may be performed in accordance with examples as disclosed herein. In some examples, aspects of the operations of 1605 may be performed by a slew rate manager 1130 as described with reference to FIG. 11.

At 1610, the method may include transmitting, to the UE, a set of reference signals over the link between the base station and the UE. The operations of 1610 may be performed in accordance with examples as disclosed herein. In some examples, aspects of the operations of 1610 may be performed by a reference signal component 1125 as described with reference to FIG. 11.

At 1615, the method may include receiving a signal indicating a slew rate associated with the link, where the slew rate includes a rate of change of a signal strength parameter associated with the set of reference signals with respect to time, and where the signal indicating the slew rate is received based on a slew rate setting associated with the link. The operations of 1615 may be performed in accordance with examples as disclosed herein. In some examples, aspects of the operations of 1615 may be performed by a slew rate manager 1130 as described with reference to FIG. 11.

At 1620, the method may include communicating with the UE based on receiving the second signal and according to the slew rate setting. The operations of 1620 may be performed in accordance with examples as disclosed herein. In some examples, aspects of the operations of 1620 may be performed by a signal manager 1135 as described with reference to FIG. 11.

The following provides an overview of aspects of the present disclosure:

Aspect 1: A method for wireless communication at a UE, comprising: receiving, from a base station, a set of reference signals over a link between the base station and the UE; transmitting a signal indicating a slew rate associated with the link, wherein the slew rate comprises a rate of change of a signal strength parameter associated with the set of reference signals with respect to time, and wherein the signal indicating the slew rate is transmitted based at least in part on a slew rate setting associated with the link; and communicating with the base station based at least in part on transmitting the signal and according to the slew rate setting.

Aspect 2: The method of aspect 1, further comprising: receiving, from the base station, a second signal indicating the slew rate setting, wherein the signal indicating the slew rate is transmitted based at least in part on receiving the second signal.

Aspect 3: The method of any of aspects 1 through 2, further comprising: transmitting, to the base station, a second signal indicating the slew rate setting, wherein the signal indicating the slew rate is transmitted based at least in part on transmitting the second signal.

Aspect 4: The method of any of aspects 1 through 3, further comprising: transmitting, to the base station, a second signal indicating a UE capability, wherein the slew rate setting is based at least in part on the UE capability.

Aspect 5: The method of any of aspects 1 through 4, wherein communicating with the base station comprises: receiving a second signal indicating one or more reference signal resources; and monitoring the one or more reference signal resources according to the slew rate setting and a beam refinement procedure or a beam failure recovery procedure.

Aspect 6: The method of aspect 5, wherein communicating with the base station further comprises: receiving a third signal indicating a beam switch at the base station, wherein monitoring the one or more reference signal resources is further based at least in part on receiving the third signal.

Aspect 7: The method of any of aspects 5 through 6, wherein communicating with the base station further comprises: switching from a first beam to a second beam for communications with the base station based at least in part on monitoring the one or more reference signal resources.

Aspect 8: The method of any of aspects 1 through 7, wherein communicating with the base station comprises: switching from a first beam to a second beam for communications with the base station according to the slew rate setting.

Aspect 9: The method of any of aspects 1 through 8, wherein the slew rate setting comprises one or more slew rate thresholds; and the signal indicating the slew rate is transmitted based at least in part on the slew rate satisfying a slew rate threshold of the one or more slew rate thresholds.

Aspect 10: The method of any of aspects 1 through 9, wherein the slew rate comprises a first slew rate corresponding to a first beam associated with the link; and the signal further indicates a second slew rate corresponding to a second beam associated with the link.

Aspect 11: The method of any of aspects 1 through 10, wherein the signal indicates the slew rate in one or more bits of a Layer 1 report.

Aspect 12: The method of any of aspects 1 through 11, wherein the signal strength parameter is based at least in part on at least a received signal strength indicator, or a reference signal received power, or both.

Aspect 13: A method for wireless communication at a base station, comprising: transmitting, to a UE, a set of reference signals over a link between the base station and the UE; receiving a signal indicating a slew rate associated with the link, wherein the slew rate comprises a rate of change of a signal strength parameter associated with the set of reference signals with respect to time, and wherein the signal indicating the slew rate is received based at least in part on a slew rate setting associated with the link; and communicating with the UE based at least in part on receiving the signal and according to the slew rate setting.

Aspect 14: The method of aspect 13, further comprising: transmitting, to the UE, a second signal indicating the slew rate setting, wherein the signal indicating the slew rate is received based at least in part on transmitting the second signal.

Aspect 15: The method of any of aspects 13 through 14, further comprising: receiving, from the UE, a second signal indicating the slew rate setting, wherein the signal indicating the slew rate is received based at least in part on receiving the second signal.

Aspect 16: The method of any of aspects 13 through 15, further comprising: receiving, from the UE, a second signal indicating a UE capability, wherein the slew rate setting is based at least in part on the UE capability.

Aspect 17: The method of any of aspects 13 through 16, wherein communicating with the UE comprises: transmitting a second signal indicating one or more reference signal resources; and transmitting one or more reference signals in the one or more reference signal resources according to the slew rate setting and a beam refinement procedure or a beam failure recovery procedure.

Aspect 18: The method of aspect 17, wherein communicating with the UE further comprises: switching from a first beam to a second beam for communications with the UE, wherein transmitting the one or more reference signals is further based at least in part on switching from the first beam to the second beam.

Aspect 19: The method of any of aspects 17 through 18, wherein communicating with the UE further comprises:

receiving a third signal indicating a beam switch at the UE based at least in part on transmitting the one or more reference signals.

Aspect 20: The method of any of aspects 13 through 19, wherein communicating with the UE comprises: receiving a third signal indicating a beam switch at the UE according to the slew rate setting.

Aspect 21: The method of any of aspects 13 through 20, wherein the slew rate setting comprises one or more slew rate thresholds; and the signal indicating the slew rate is received based at least in part on the slew rate satisfying a slew rate threshold of the one or more slew rate thresholds.

Aspect 22: The method of any of aspects 13 through 21, wherein the slew rate comprises a first slew rate corresponding to a first beam associated with the link; and the signal further indicates a second slew rate corresponding to a second beam associated with the link.

Aspect 23: The method of any of aspects 13 through 22, wherein the signal indicates the slew rate in one or more bits of a Layer 1 report.

Aspect 24: The method of any of aspects 13 through 23, wherein the signal strength parameter is based at least in part on at least a received signal strength indicator, or a reference signal received power, or both.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at a base station, comprising a processor; memory coupled with the processor; and instructions stored in the memory and executable by the processor to cause the apparatus to perform a method of any of aspects 13 through 24.

Aspect 29: An apparatus for wireless communication at a base station, comprising at least one means for performing a method of any of aspects 13 through 24.

Aspect 30: A non-transitory computer-readable medium storing code for wireless communication at a base station, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving, from a base station, a set of reference signals over a link between the base station and the UE;

transmitting a signal indicating a slew rate associated with the link, wherein the slew rate comprises a rate of change of a signal strength parameter associated with the set of reference signals with respect to time, and wherein the signal indicating the slew rate is transmitted based at least in part on a slew rate setting associated with the link; and communicating with the base station based at least in part on transmitting the signal and according to the slew rate setting.

2. The method of claim 1, further comprising:

receiving, from the base station, a second signal indicating the slew rate setting, wherein the signal indicating the slew rate is transmitted based at least in part on receiving the second signal.

3. The method of claim 1, further comprising:

transmitting, to the base station, a second signal indicating the slew rate setting, wherein the signal indicating the slew rate is transmitted based at least in part on transmitting the second signal.

4. The method of claim 1, further comprising:

transmitting, to the base station, a second signal indicating a UE capability, wherein the slew rate setting is based at least in part on the UE capability.

5. The method of claim 1, wherein communicating with the base station comprises:

receiving a second signal indicating one or more reference signal resources; and monitoring the one or more reference signal resources according to the slew rate setting and a beam refinement procedure or a beam failure recovery procedure.

6. The method of claim 5, wherein communicating with the base station further comprises:

receiving a third signal indicating a beam switch at the base station, wherein monitoring the one or more reference signal resources is further based at least in part on receiving the third signal.

7. The method of claim 5, wherein communicating with the base station further comprises:

switching from a first beam to a second beam for communications with the base station based at least in part on monitoring the one or more reference signal resources.

8. The method of claim 1, wherein communicating with the base station comprises:

switching from a first beam to a second beam for communications with the base station according to the slew rate setting.

9. The method of claim 1, wherein:

the slew rate setting comprises one or more slew rate thresholds; and the signal indicating the slew rate is transmitted based at least in part on the slew rate satisfying a slew rate threshold of the one or more slew rate thresholds.

10. The method of claim 1, wherein:

the slew rate comprises a first slew rate corresponding to a first beam associated with the link; and the signal further indicates a second slew rate corresponding to a second beam associated with the link.

11. The method of claim 1, wherein the signal indicates the slew rate in one or more bits of a Layer 1 report.

12. The method of claim 1, wherein the signal strength parameter is based at least in part on at least a received signal strength indicator, or a reference signal received power, or both.

13. A method for wireless communication at a base station, comprising:

transmitting, to a user equipment (UE), a set of reference signals over a link between the base station and the UE;

receiving a signal indicating a slew rate associated with the link, wherein the slew rate comprises a rate of change of a signal strength parameter associated with the set of reference signals with respect to time, and wherein the signal indicating the slew rate is received based at least in part on a slew rate setting associated with the link; and communicating with the UE based at least in part on receiving the signal and according to the slew rate setting.

14. The method of claim 13, further comprising:

transmitting, to the UE, a second signal indicating the slew rate setting, wherein the signal indicating the slew rate is received based at least in part on transmitting the second signal.

15. The method of claim 13, further comprising:

receiving, from the UE, a second signal indicating the slew rate setting, wherein the signal indicating the slew rate is received based at least in part on receiving the second signal.

16. The method of claim 13, further comprising:

receiving, from the UE, a second signal indicating a UE capability, wherein the slew rate setting is based at least in part on the UE capability.

17. The method of claim 13, wherein communicating with the UE comprises:

transmitting a second signal indicating one or more reference signal resources; and transmitting one or more reference signals in the one or more reference signal resources according to the slew rate setting and a beam refinement procedure or a beam failure recovery procedure.

18. The method of claim 17, wherein communicating with the UE further comprises:

switching from a first beam to a second beam for communications with the UE, wherein transmitting the one or more reference signals is further based at least in part on switching from the first beam to the second beam.

19. The method of claim 17, wherein communicating with the UE further comprises:

receiving a third signal indicating a beam switch at the UE based at least in part on transmitting the one or more reference signals.

20. The method of claim 13, wherein communicating with the UE comprises:

receiving a third signal indicating a beam switch at the UE according to the slew rate setting.

21. The method of claim 13, wherein:

the slew rate setting comprises one or more slew rate thresholds; and the signal indicating the slew rate is received based at least in part on the slew rate satisfying a slew rate threshold of the one or more slew rate thresholds.

22. The method of claim 13, wherein:

the slew rate comprises a first slew rate corresponding to a first beam associated with the link; and the signal further indicates a second slew rate corresponding to a second beam associated with the link.

23. The method of claim 13, wherein the signal indicates the slew rate in one or more bits of a Layer 1 report.

24. The method of claim 13, wherein the signal strength parameter is based at least in part on at least a received signal strength indicator, or a reference signal received power, or both.

25. An apparatus for wireless communication at a user equipment (UE), comprising:

a processor;

memory coupled with the processor; and instructions stored in the memory and executable by the processor to cause the apparatus to:

receive, from a base station, a set of reference signals over a link between the base station and the UE;

transmit a signal indicating a slew rate associated with the link, wherein the slew rate comprises a rate of change of a signal strength parameter associated with the set of reference signals with respect to time, and wherein the signal indicating the slew rate is transmitted based at least in part on a slew rate setting associated with the link; and communicate with the base station based at least in part on transmitting the signal and according to the slew rate setting.

26. The apparatus of claim 25, wherein the instructions are further executable by the processor to cause the apparatus to:

receive, from the base station, a second signal indicating the slew rate setting, wherein the signal indicating the slew rate is transmitted based at least in part on receiving the second signal.

27. The apparatus of claim 25, wherein the instructions are further executable by the processor to cause the apparatus to:

transmit, to the base station, a second signal indicating the slew rate setting, wherein the signal indicating the slew rate is transmitted based at least in part on transmitting the second signal.

28. An apparatus for wireless communication at a base station, comprising:

a processor;

memory coupled with the processor; and instructions stored in the memory and executable by the processor to cause the apparatus to:

transmit, to a user equipment (UE), a set of reference signals over a link between the base station and the UE;

receive a signal indicating a slew rate associated with the link, wherein the slew rate comprises a rate of change of a signal strength parameter associated with the set of reference signals with respect to time, and wherein the signal indicating the slew rate is received based at least in part on a slew rate setting associated with the link; and communicate with the UE based at least in part on receiving the signal and according to the slew rate setting.

29. The apparatus of claim 28, wherein the instructions are further executable by the processor to cause the apparatus to:

transmit, to the UE, a second signal indicating the slew rate setting, wherein the signal indicating the slew rate is received based at least in part on transmitting the second signal.

30. The apparatus of claim 28, wherein the instructions are further executable by the processor to cause the apparatus to:

receive, from the UE, a second signal indicating the slew rate setting, wherein the signal indicating the slew rate is received based at least in part on receiving the second signal.

* * * * *